Feb. 12, 1952 W. S. PRAEG 2,585,271
GEAR FINISHING MACHINE
Filed April 15, 1946 18 Sheets-Sheet 1

INVENTOR.
WALTER S. PRAEG
BY
ATTORNEYS

Feb. 12, 1952     W. S. PRAEG     2,585,271
GEAR FINISHING MACHINE

Filed April 15, 1946     18 Sheets-Sheet 4

INVENTOR.
WALTER S. PRAEG
BY
ATTORNEYS

Feb. 12, 1952 W. S. PRAEG 2,585,271
GEAR FINISHING MACHINE
Filed April 15, 1946 18 Sheets-Sheet 5
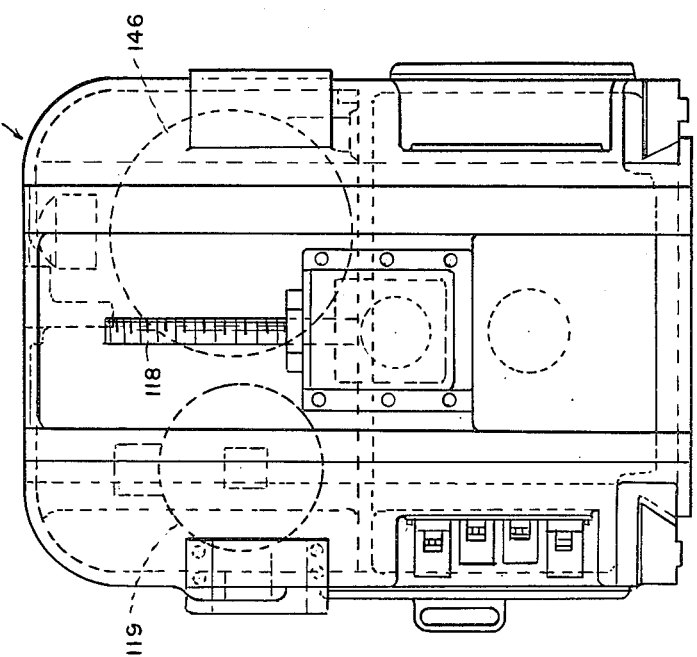
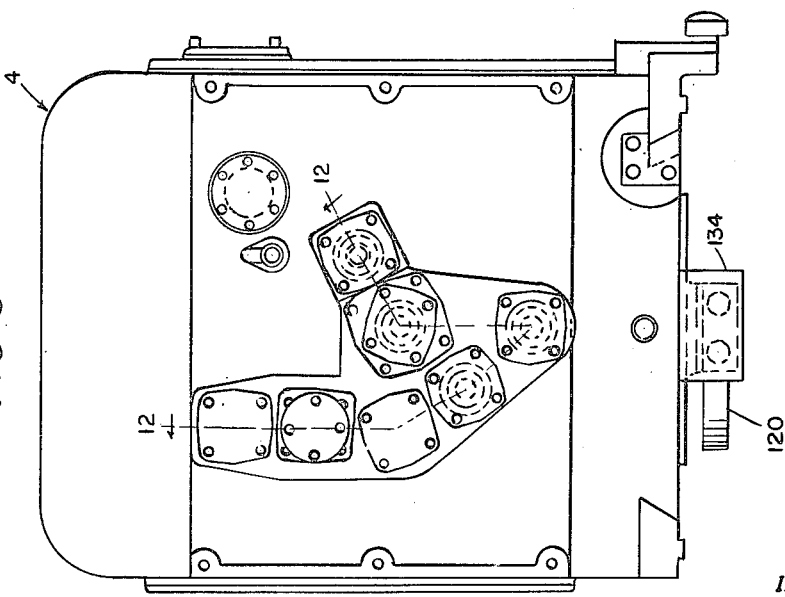
INVENTOR.
WALTER S. PRAEG
BY
ATTORNEYS Feb. 12, 1952 W. S. PRAEG 2,585,271
GEAR FINISHING MACHINE
Filed April 15, 1946 18 Sheets-Sheet 6
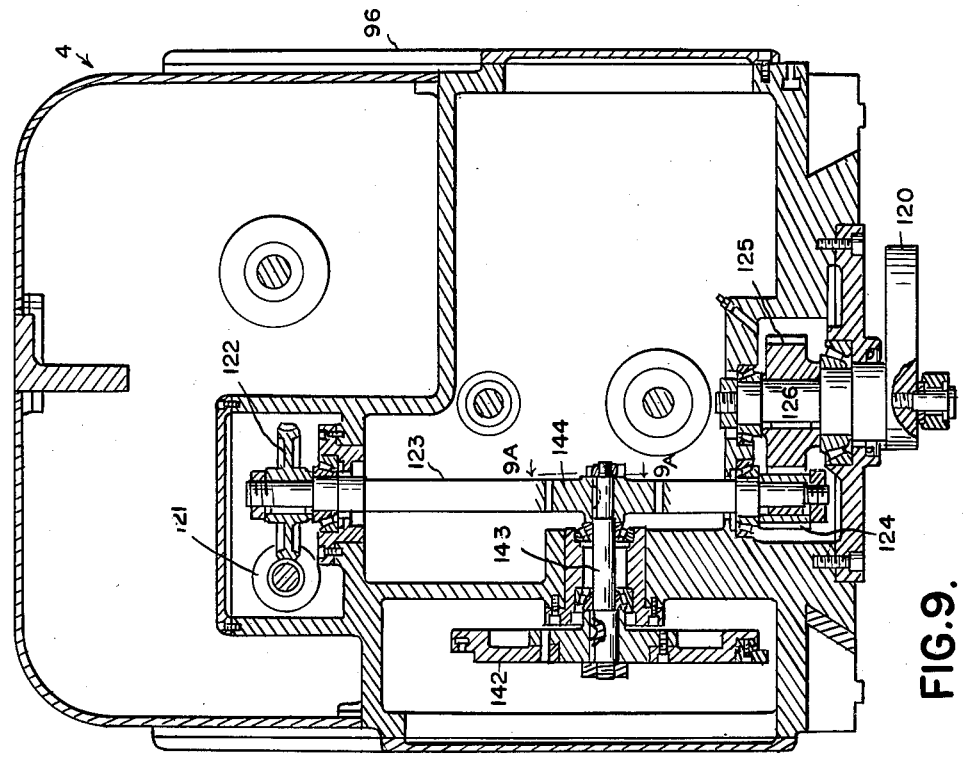
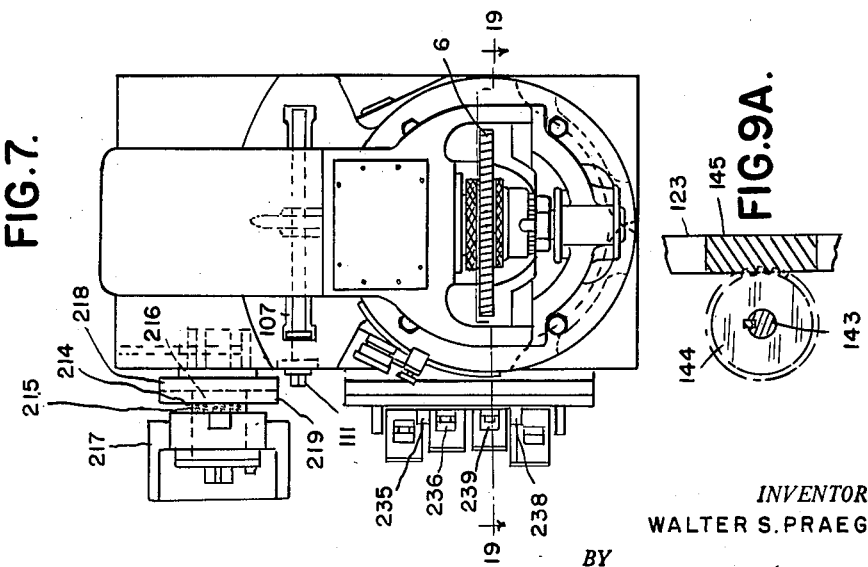
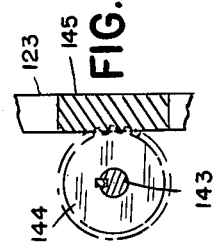
*INVENTOR.*
WALTER S. PRAEG
BY
ATTORNEYS

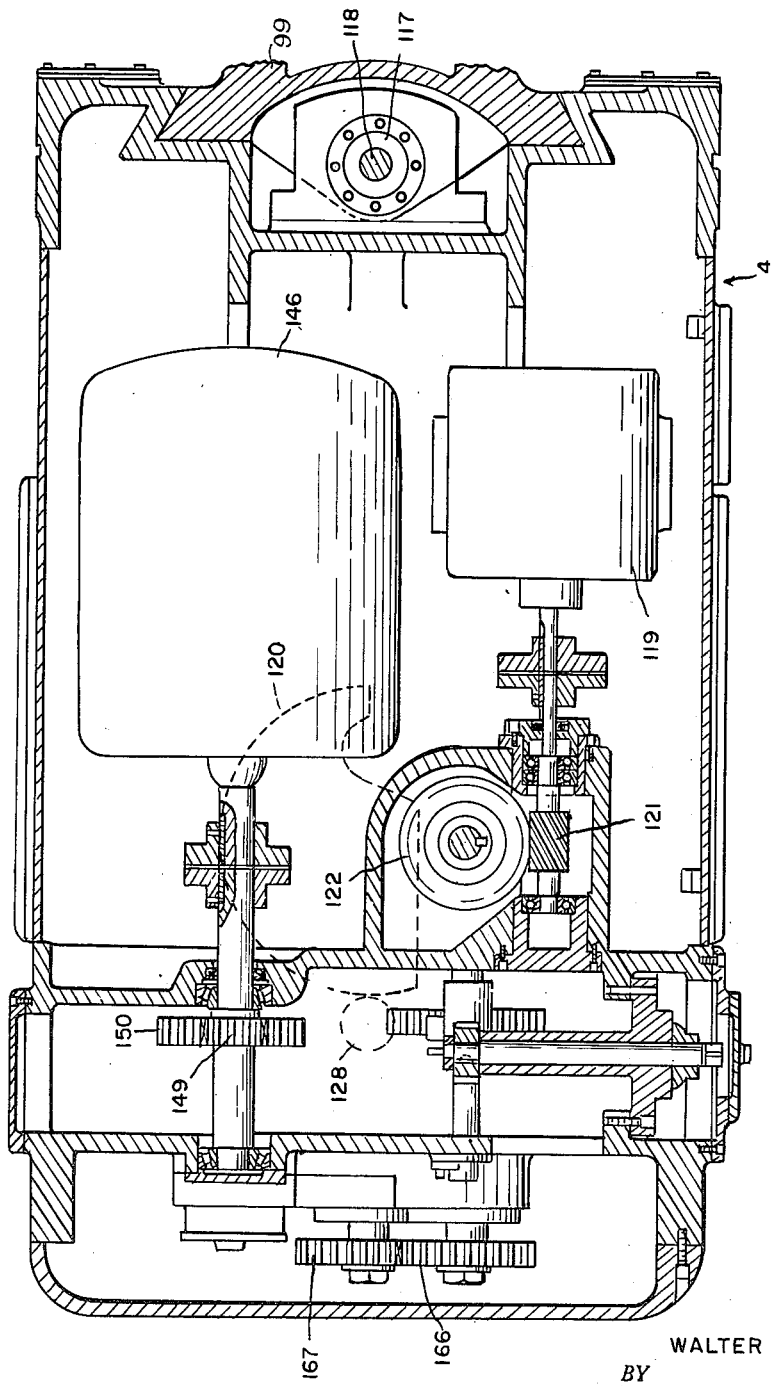

Feb. 12, 1952 W. S. PRAEG 2,585,271
GEAR FINISHING MACHINE
Filed April 15, 1946 18 Sheets-Sheet 8
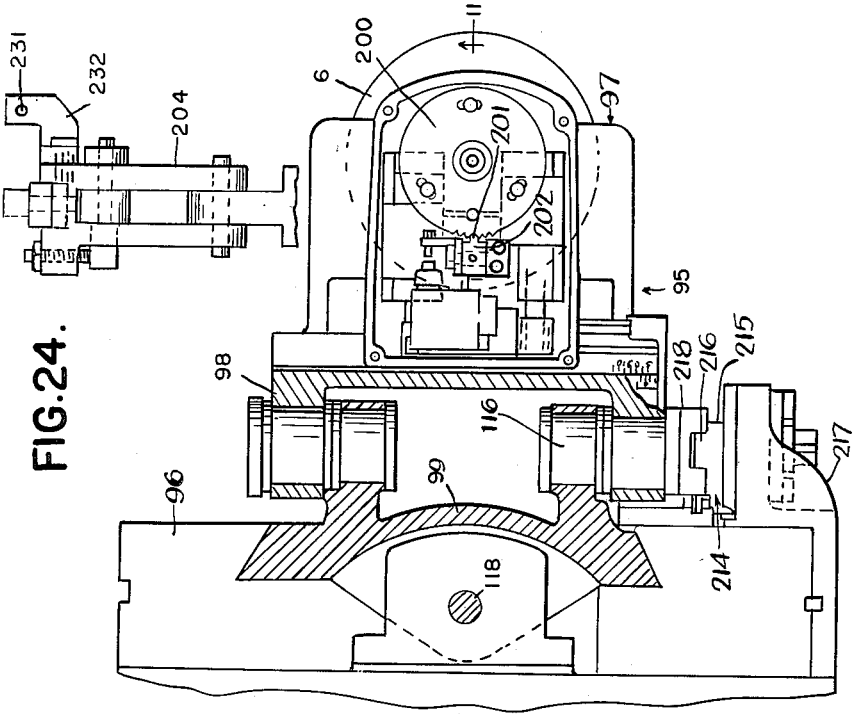
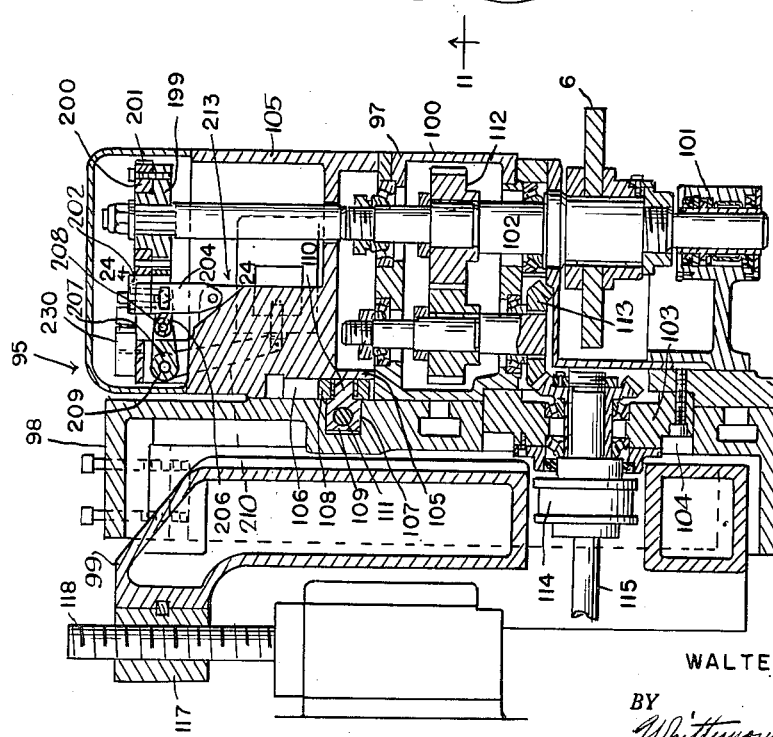
INVENTOR.
WALTER S. PRAEG
BY
ATTORNEYS Feb. 12, 1952 W. S. PRAEG 2,585,271
GEAR FINISHING MACHINE
Filed April 15, 1946 18 Sheets-Sheet 9

INVENTOR.
WALTER S. PRAEG
BY
*Whittemore Hulbert & Belknap*
ATTORNEYS

Feb. 12, 1952 — W. S. PRAEG — 2,585,271
GEAR FINISHING MACHINE
Filed April 15, 1946 — 18 Sheets-Sheet 10

*INVENTOR.*
WALTER S. PRAEG
BY
ATTORNEYS

INVENTOR.
WALTER S. PRAEG

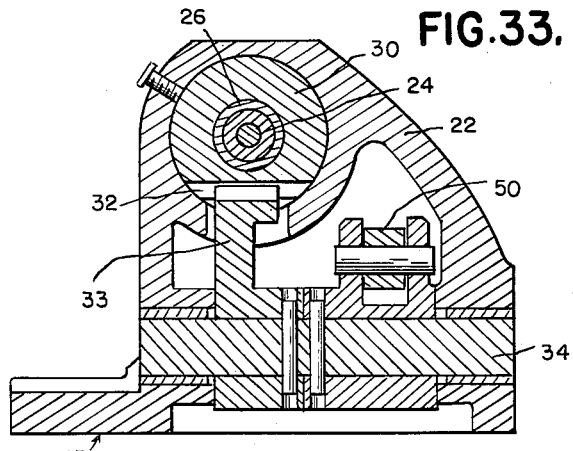
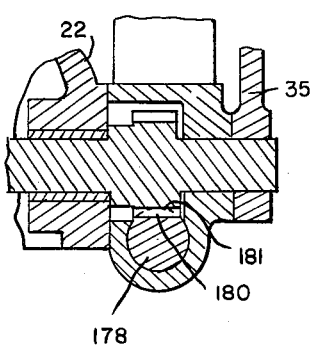
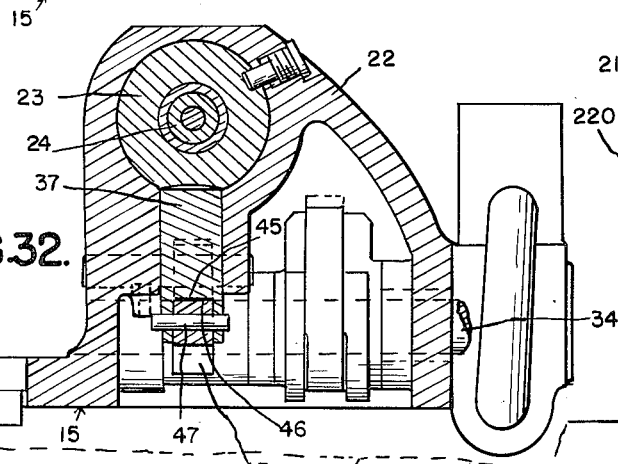
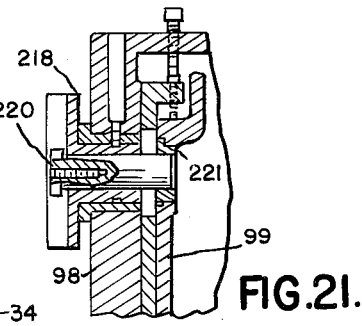
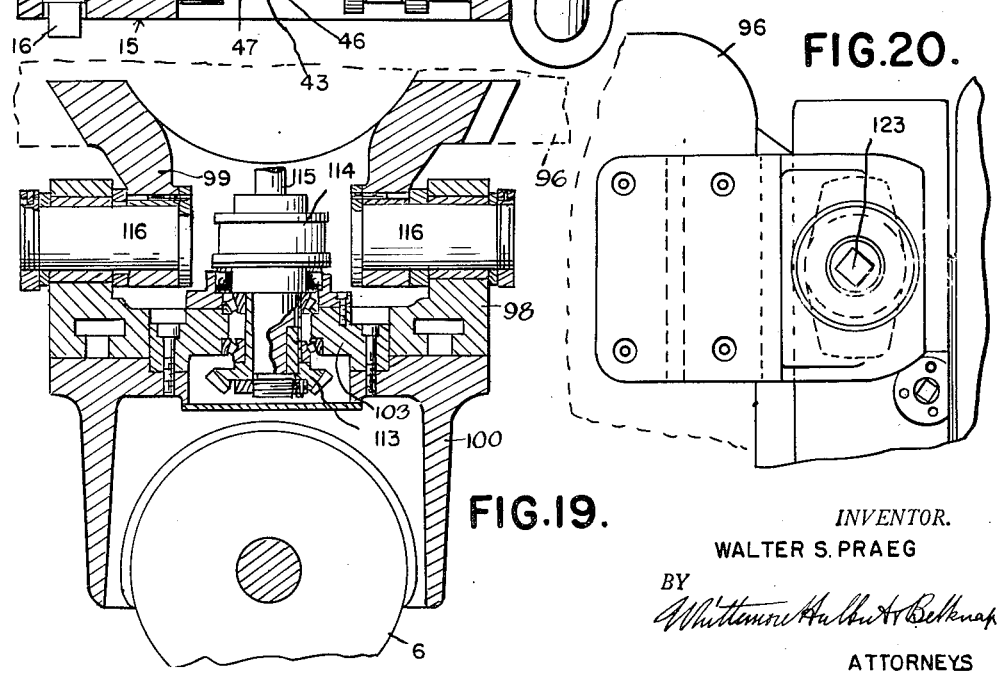

Feb. 12, 1952 W. S. PRAEG 2,585,271
GEAR FINISHING MACHINE
Filed April 15, 1946 18 Sheets-Sheet 13

INVENTOR.
WALTER S. PRAEG
BY
ATTORNEYS

Feb. 12, 1952 W. S. PRAEG 2,585,271
GEAR FINISHING MACHINE
Filed April 15, 1946 18 Sheets-Sheet 14

INVENTOR.
WALTER S. PRAEG
BY
*Whittemore Hulbert & Belknap,*
ATTORNEYS

Feb. 12, 1952 W. S. PRAEG 2,585,271
GEAR FINISHING MACHINE
Filed April 15, 1946 18 Sheets-Sheet 15
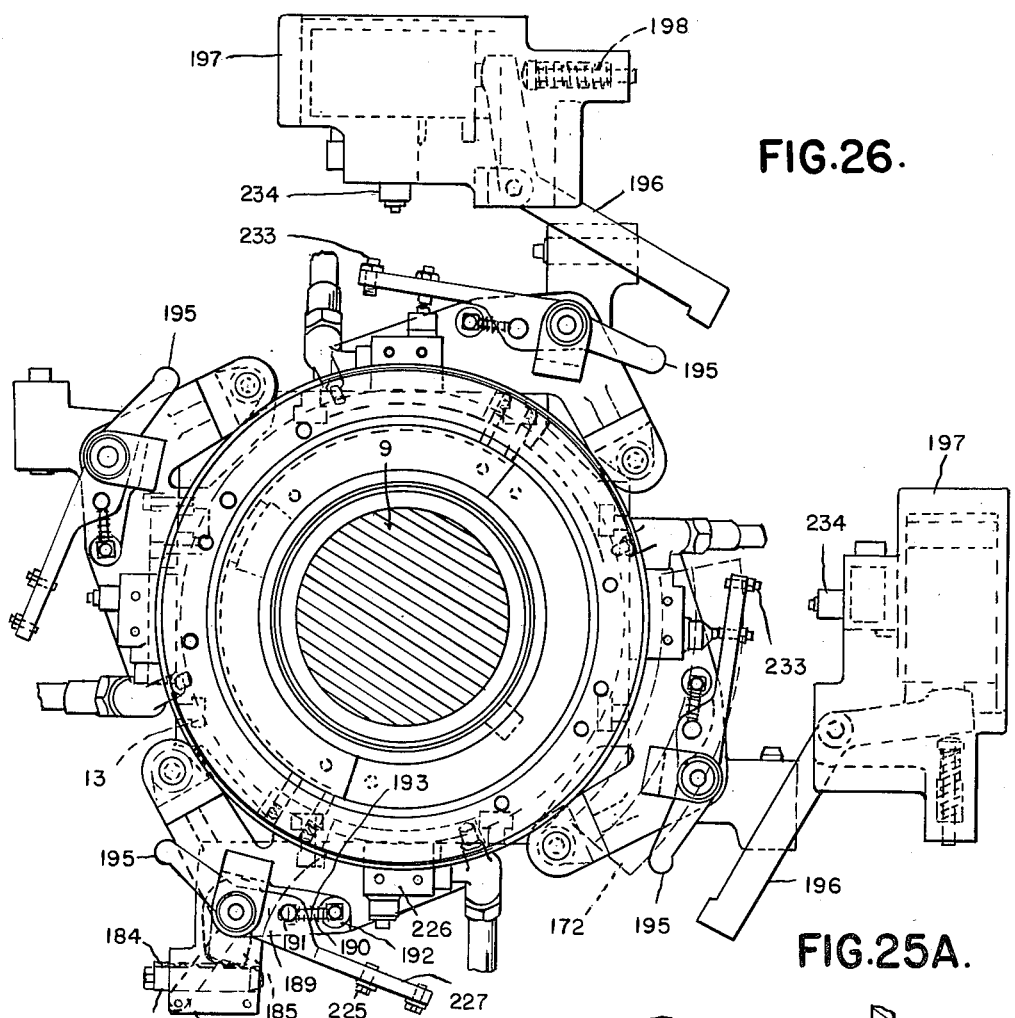
FIG.26.
FIG.25A.
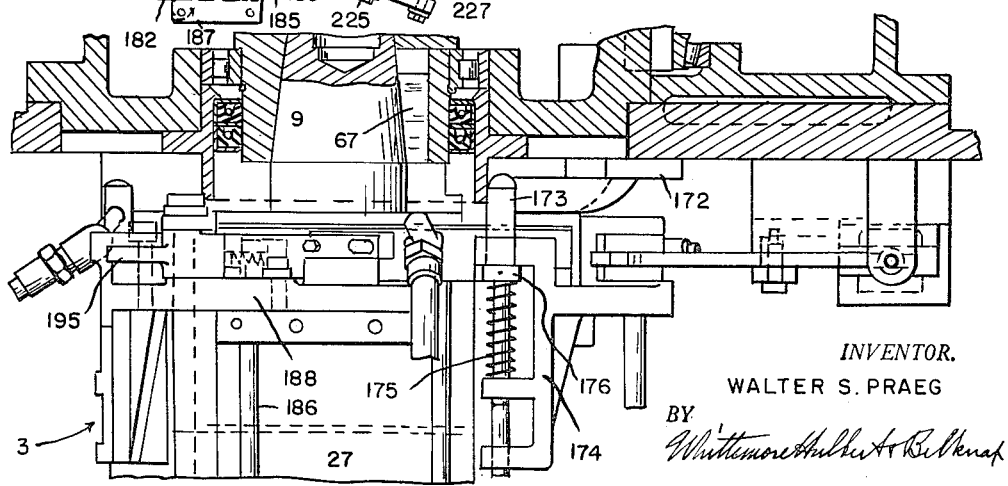
INVENTOR.
WALTER S. PRAEG
BY
Whittemore Hulbert & Belknap
ATTORNEYS Feb. 12, 1952 W. S. PRAEG 2,585,271
GEAR FINISHING MACHINE
Filed April 15, 1946 18 Sheets-Sheet 16

INVENTOR.
WALTER S. PRAEG
BY
Whittemore Hulbert Belknap
ATTORNEYS

Feb. 12, 1952      W. S. PRAEG      2,585,271
GEAR FINISHING MACHINE
Filed April 15, 1946      18 Sheets-Sheet 17
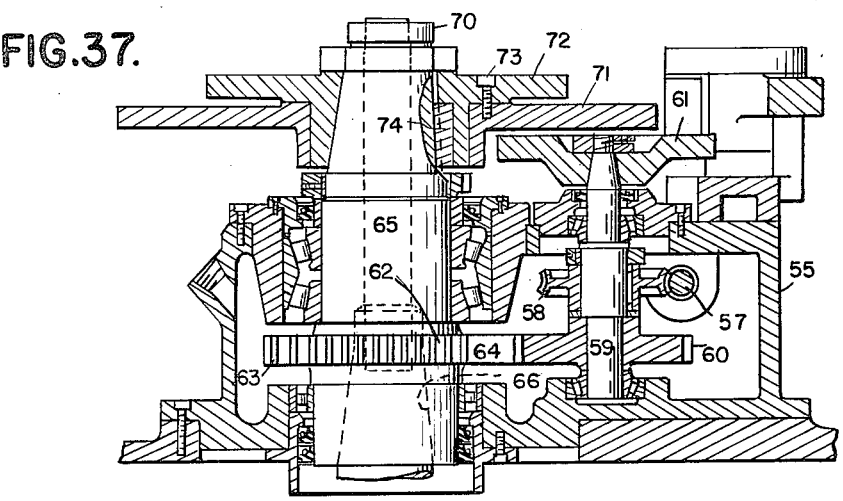
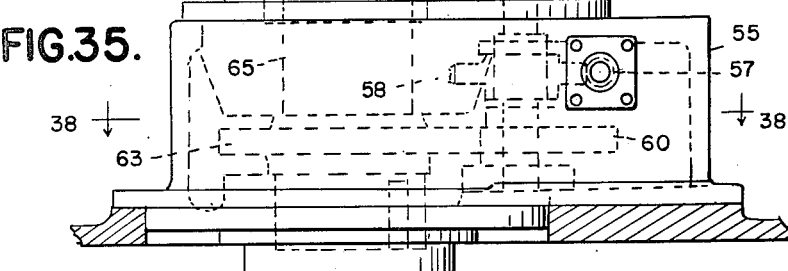
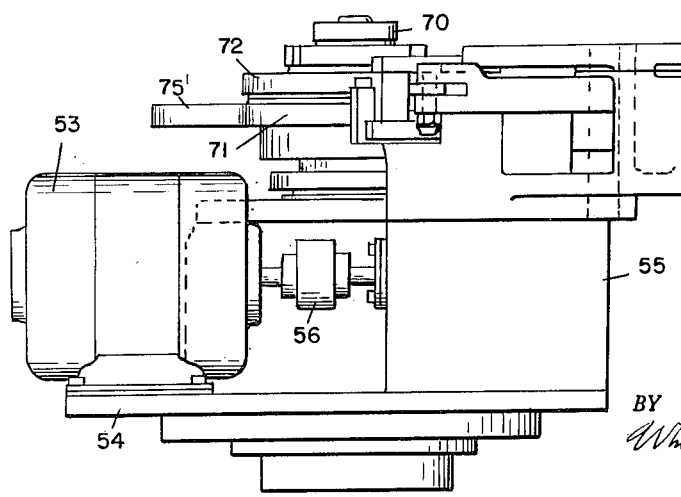
*INVENTOR.*
WALTER S. PRAEG
BY
ATTORNEYS Feb. 12, 1952 W. S. PRAEG 2,585,271
GEAR FINISHING MACHINE
Filed April 15, 1946 18 Sheets-Sheet 18
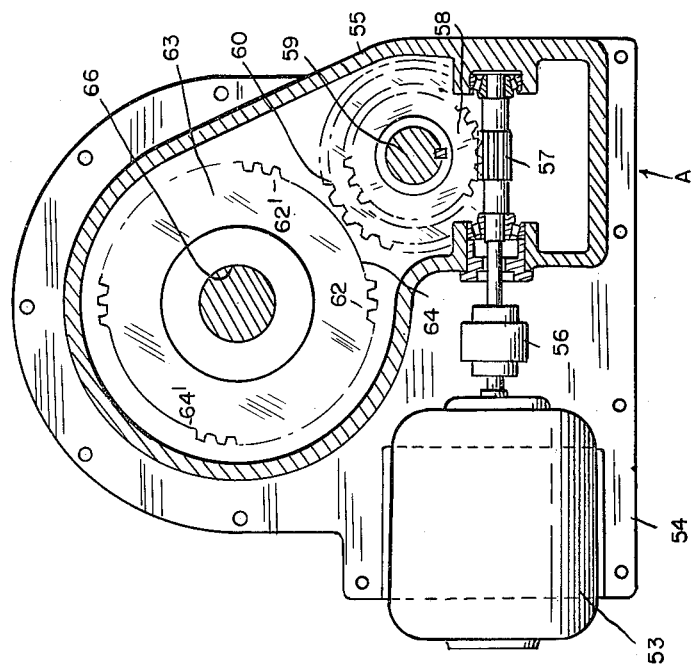
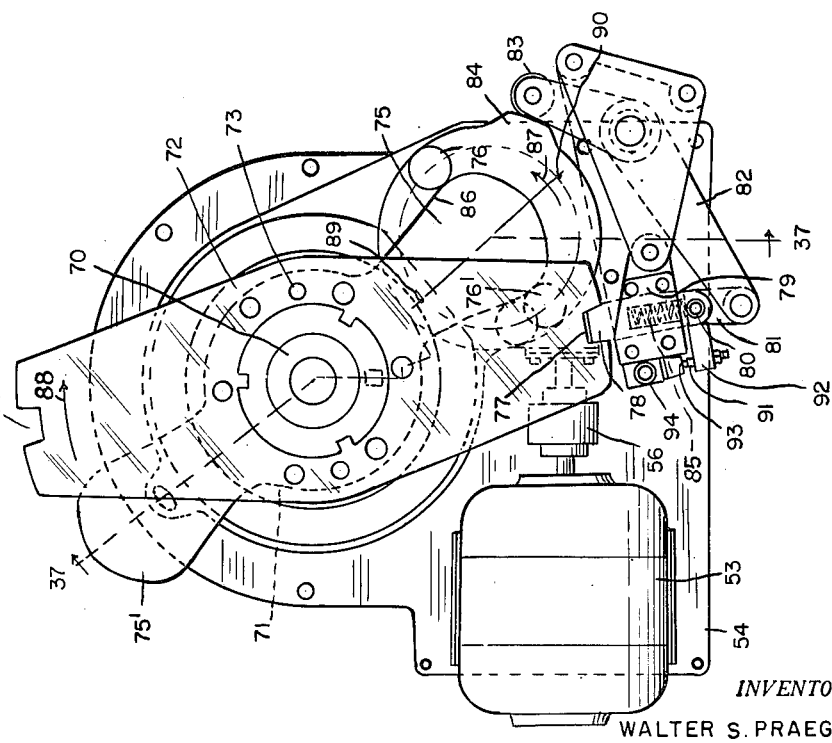
INVENTOR.
WALTER S. PRAEG
BY
Whittemore Hulbert & Belknap,
ATTORNEYS Patented Feb. 12, 1952

2,585,271

UNITED STATES PATENT OFFICE 2,585,271

GEAR FINISHING MACHINE

Walter S. Praeg, Detroit, Mich., assignor to National Broach & Machine Company, Detroit, Mich., a corporation of Michigan Application April 15, 1946, Serial No. 662,280

15 Claims. (Cl. 90—1.6)

The invention relates to gear finishing machines and refers more particularly to machines for finishing the faces of the teeth of semi-finished or roughed-out gears.

The invention has for one of its objects to provide an improved machine which is constructed to economically finish gears.

The invention has for another object to provide an improved machine in which the finishing tool is engageable with a work gear and performs the finishing operation while an operator replaces a finished work gear by a semi-finished or roughed-out work gear.

The invention has for still another object to provide an improved machine comprising a plurality of finishing tools each of which is engageable with a work gear and performs the finishing operation on its work gear while an operator replaces the finished work gears by semi-finished or roughed-out work gears.

The invention has for a further object to provide an improved machine comprising a turret for carrying the work gears, a member carrying the work gear finishing tool, index mechanism for indexing the turret to position a work gear for engagement by the tool, and mechanism for relatively moving the slide and turret toward and away from each other to engage the work gear and tool or disengage the same.

The invention has for further objects to provide means for accurately locating the semi-finished or roughed-out work gear in a predetermined angular position to accurately locate a space between adjacent teeth of the work gear with respect to the tool, to provide means for accurately locating the finishing tool to accurately engage a work gear; to provide an improved construction of reciprocable main slide and finishing tool head assembly for driving the finishing tool and also moving the finishing tool to traverse the work gear; and to provide an improved construction in which the finishing tool while traversing the work gear has the motion imparted to it to effect crowning of the teeth of the work gear.

The invention has for still further objects to provide means for stopping the operation of the machine in the event that the work gears are not properly secured in place in their work gear holding fixtures or the finishing tool and work gear with which the finishing tool is engageable are not properly angularly positioned to accurately mesh.

These and other objects of the invention will become apparent from the following description taken in connection with the accompanying drawings in which:

Figures 5 and 6 are end views of the main slide;

Figure 7 is an end view of the cutter head assembly;

Figures 8 and 8A are complementary cross sections on the line 8—8 of Figure 3;

Figure 9 is a cross section on the line 9—9 of Figure 3;

Figure 9A is a cross section on the line 9A—9A of Figure 9;

Figure 11 is a cross section on the line 11—11 of Figure 8A;

Figure 1:
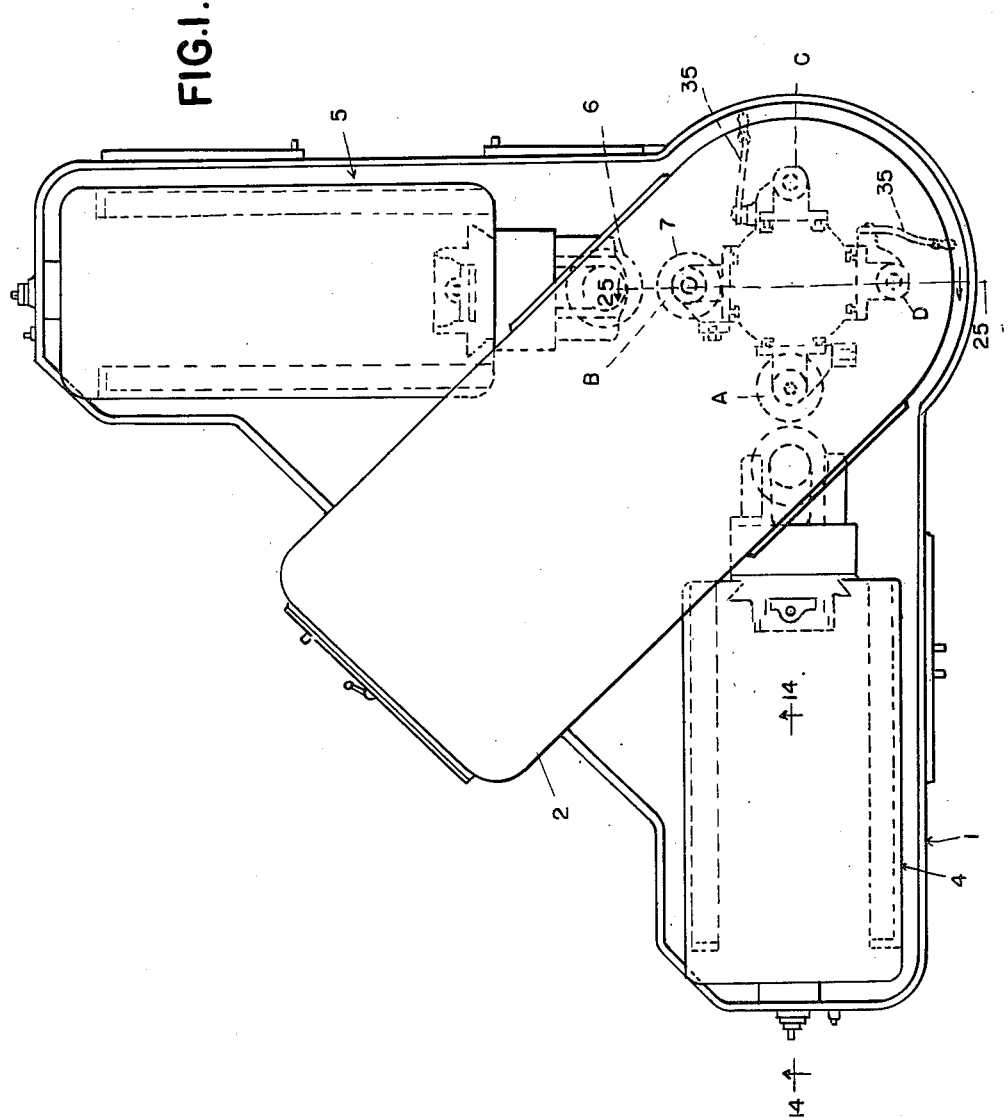
Figure 1 is a plan view of the gear finishing machine embodying the invention.
Figure 2:
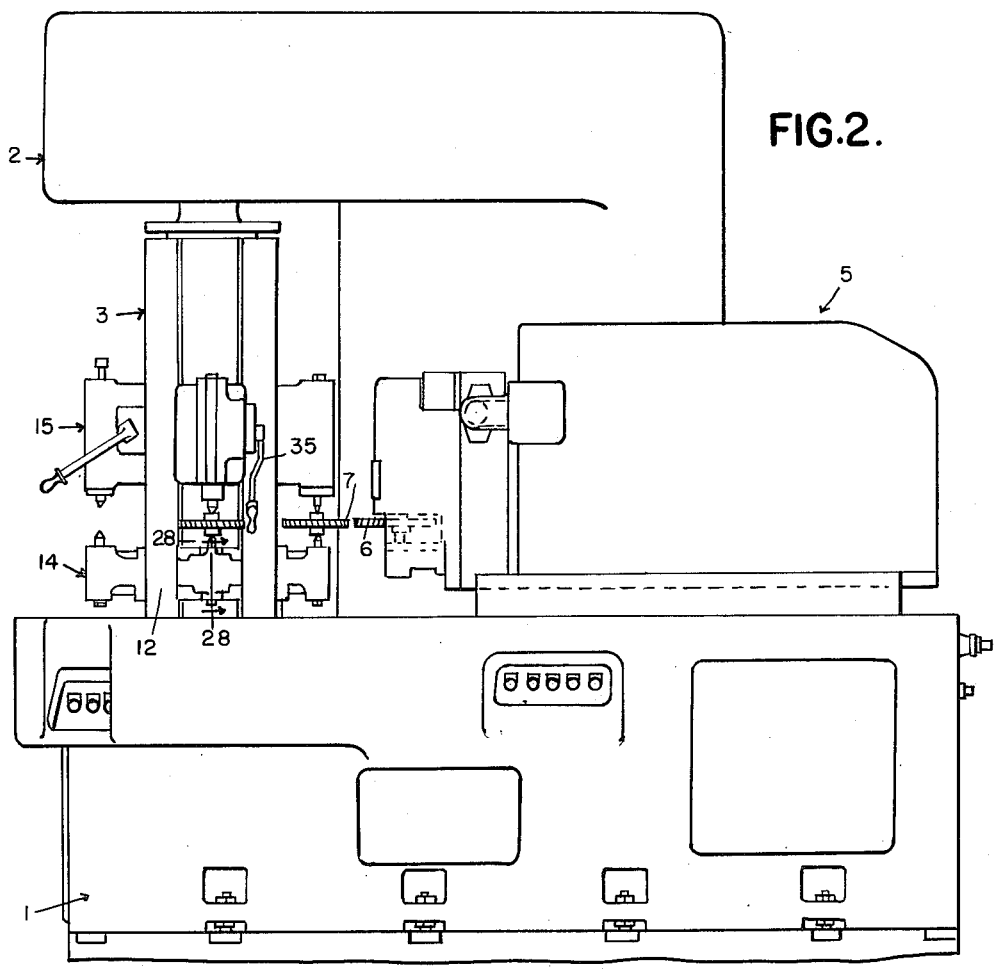
Figure 2 is a side elevation thereof.
Figure 4:
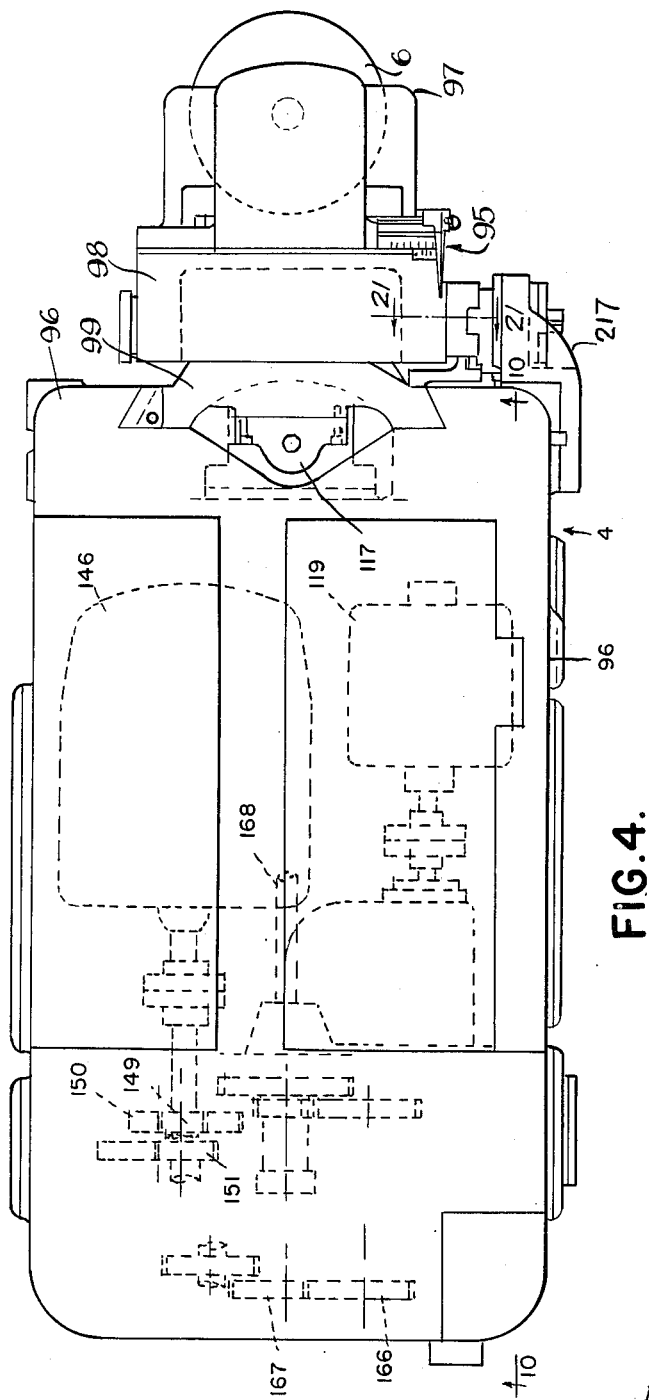
Figure 4 is a plan view of the main slide and cutter head assembly.
Figure 16:
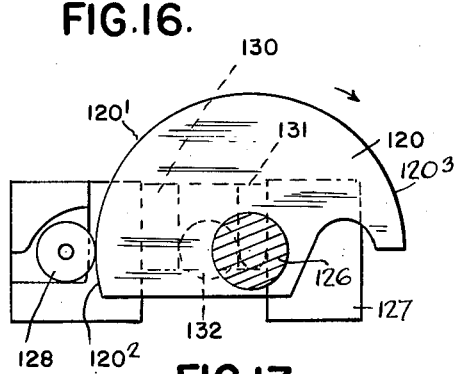
Figure 17:
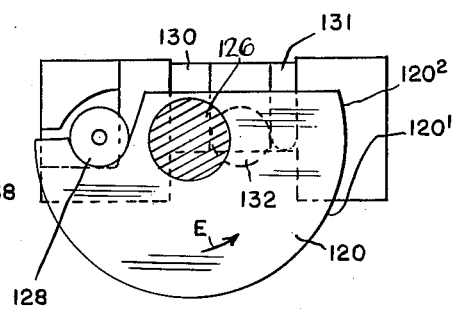
Figure 18:
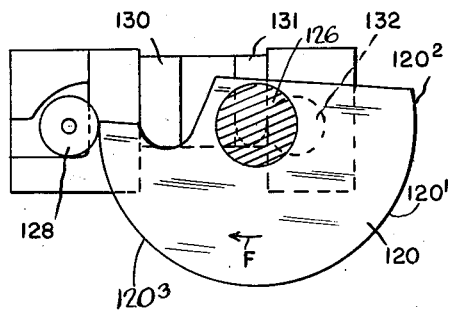
Figure 14:
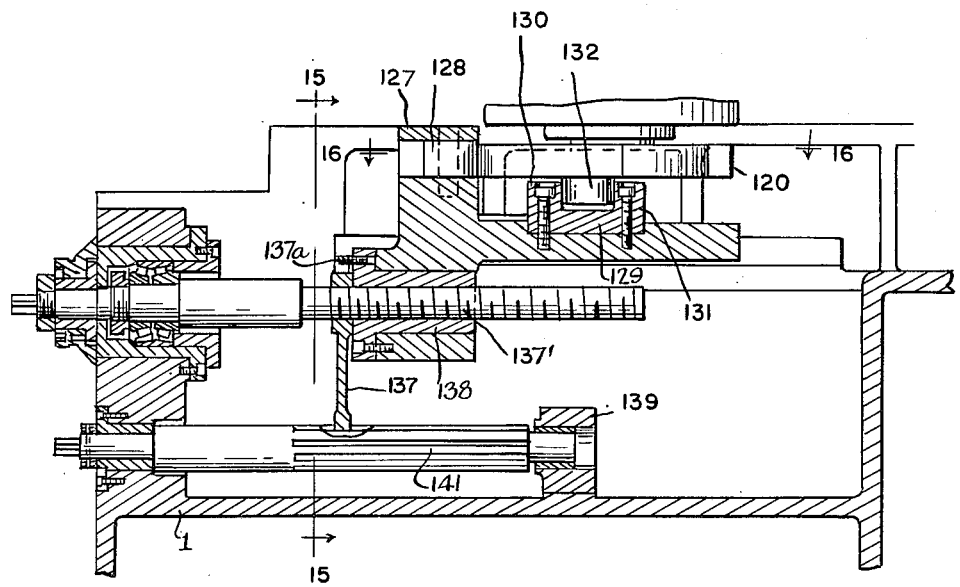
Figure 14 is a cross section on the line 14—14 of Figure 1 illustrating the cam mechanism for reciprocating the main slide.
Figure 15:
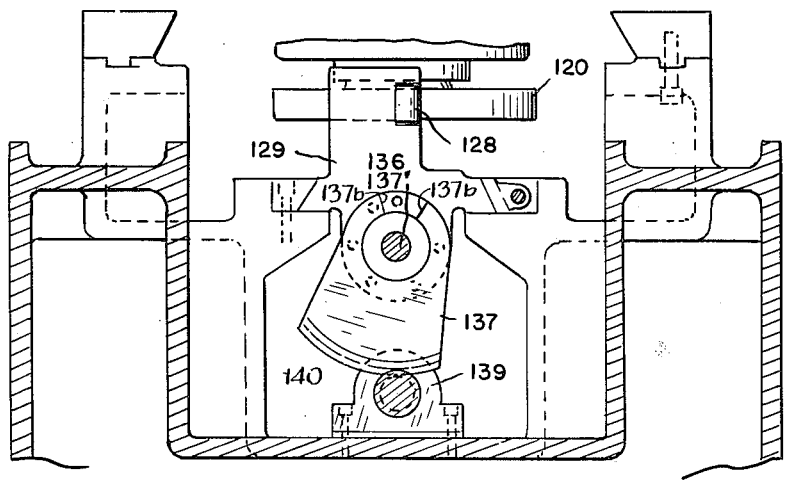
Figure 28:
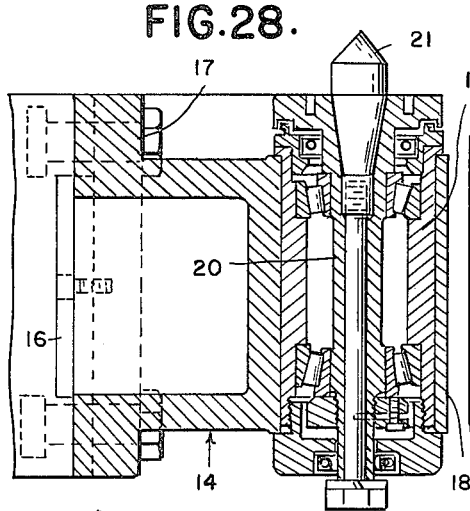
Figure 27:
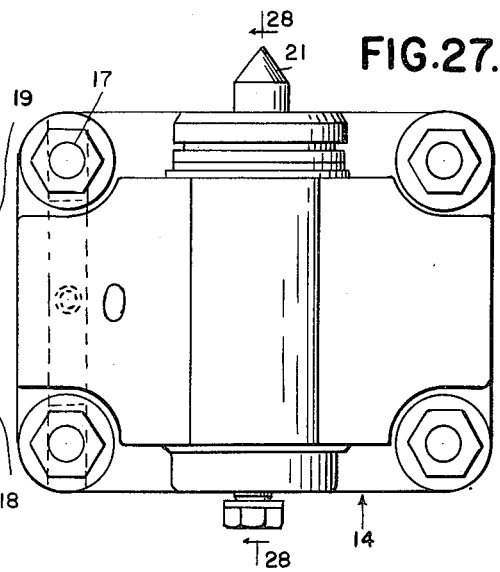
Figure 23:
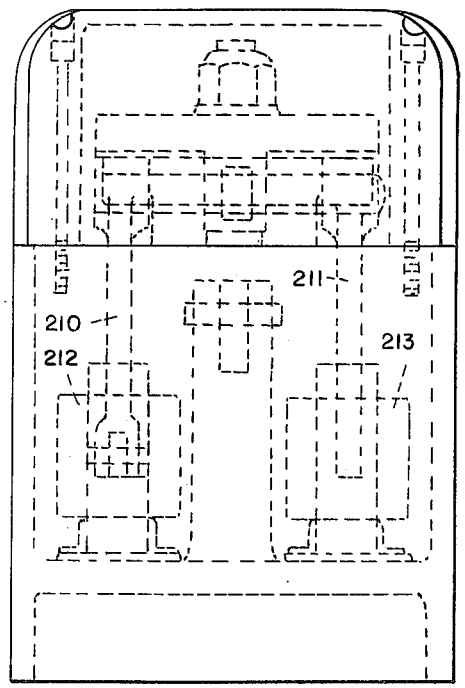
Figure 22:
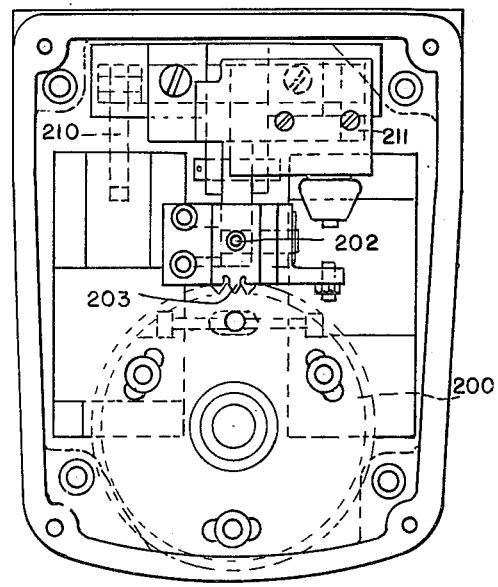
Figure 25:
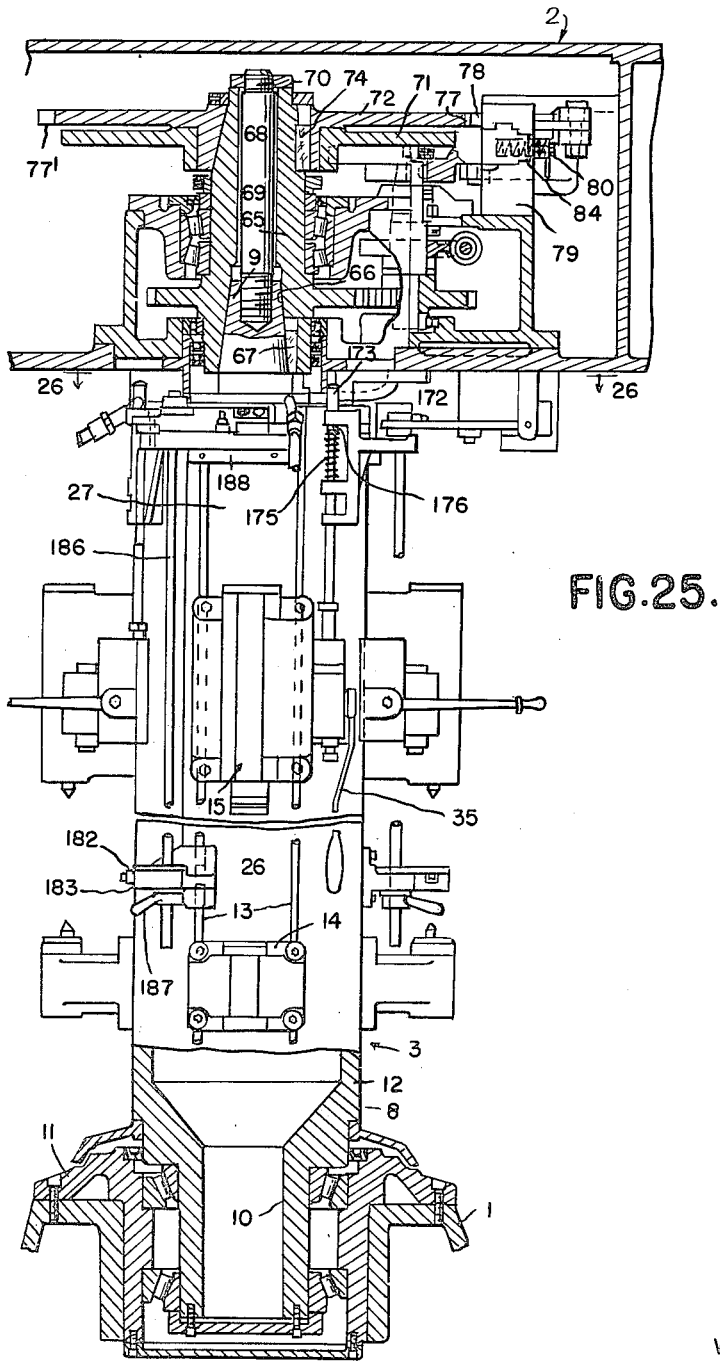
Figure 29:
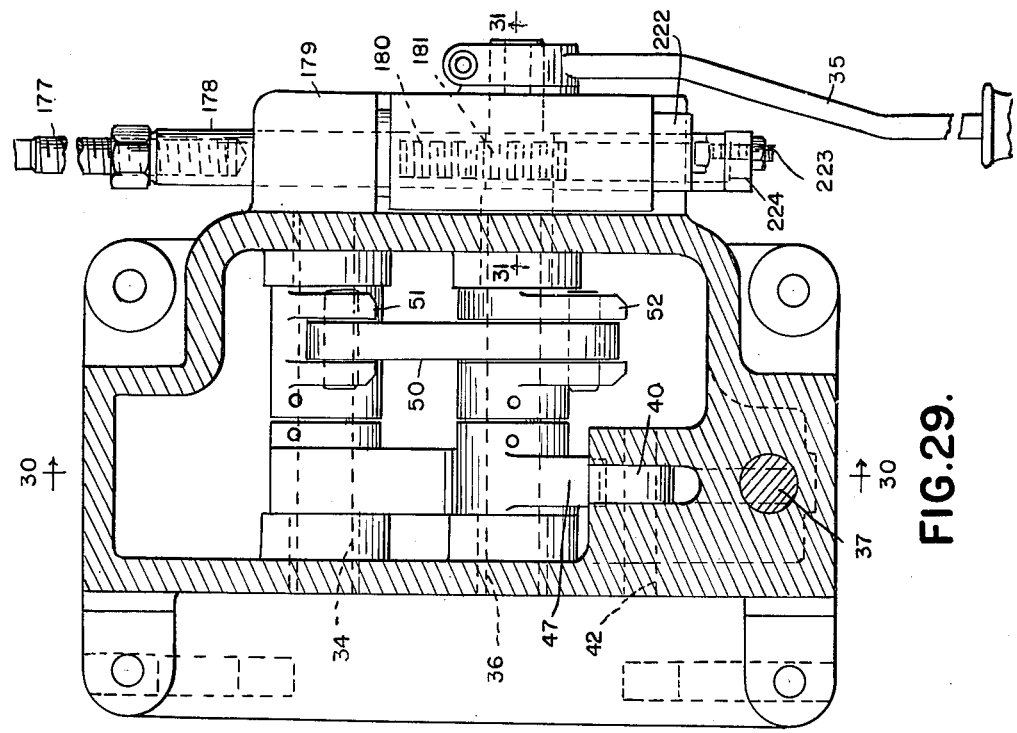
Figure 30:
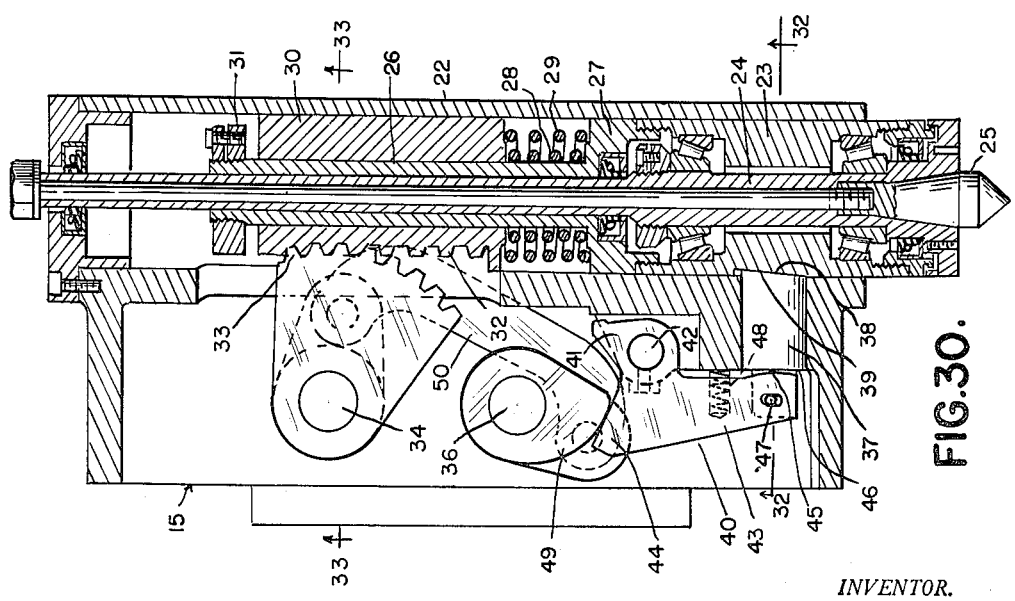

Figures 15 and 16 are cross sections on the lines 15—15 and 16—16 respectively of Figure 14;

Figures 17 and 18 are views similar to Figure 16 illustrating the operation of the cam mechanism;

Figure 19 is a cross section on the line 19—19 of Figure 7;

Figure 20 is an elevation of a portion of Figure 7;

Figure 21 is a cross section on the line 21—21 of Figure 4;

Figure 22 is a top plan view of the cutter head with the cap removed illustrating the mechanism for indexing the cutter;

Figure 23 is an end elevation thereof;

Figure 24 is a cross section on the line 24—24 of Figure 11;

Figure 25 is a cross section taken generally on the line 25—25 of Figure 1;

Figure 25A is an enlarged view of a portion of Figure 25;

Figure 26 is a cross section on the line 26—26 of Figure 25;

Figure 27 is an enlarged elevation of the lower work gear holding fixture of Figure 25;

Figure 28 is a cross section on the line 28—28 of Figure 2;

Figure 29 is an enlarged elevation partly in section of the upper work gear holding fixture of Figure 25;

Figure 30 and 31 are cross sections respectively on the line 30—30 and 31—31 of Figure 29;

Figures 32 and 33 are cross sections respectively on the lines 32—32 and 33—33 of Figure 30;

Figures 34 and 35 are elevations of the indexing mechanism for the turret;

Figure 36 is a top plan of the mechanism of Figure 34;

Figure 37 is a cross section on line 37—37 of Figure 36;

Figure 38 is a cross section on line 38—38 of Figure 35.

While the gear finishing machine may be of the single or multiple cutter type, it is as illustrated in Figures 1 to 38 inclusive, of the multiple-cutter type and comprises the base 1, the turret overhead support 2, the vertical turret 3, between the base and support, and the pair of main slides 4 and 5 horizontally slidable on ways on the base toward and away from the turret and carrying the cutters 6 which are engageable with the semi-finished work gears 7 which are carried by the turret. In the present instance the main slides are reciprocable at an angle of 90° to each other.

The turret 3, as best seen in Figure 25, consists of the tubular member 8 and the stub shaft 9 which is suitably secured to the upper end of the tubular member and is preferably piloted therewithin. The tubular member has the cylindrical lower end 10 which is journaled in the bearing carrier 11 secured to the base 1. The tubular member also has the substantially square body 12 above the bearing carrier and made with faces at substantially right angles to each other, each face being provided with the pair of longitudinally extending T-shaped slots 13.

14 and 15 are cooperating work gear holding fixtures keyed to each face of the turret by the keys 16 (Figure 28) engaging the slots 13 and secured to each face of the turret by suitable means such as the bolts 17. The fixtures are longitudinally adjustable of the turret and, as shown, are arranged on the turret with their axes 90° apart. As a result the turret has four equally spaced stations—A, B, C, and D, the stations A and B being used as the work gear finishing stations, and the stations C and D being used as the work gear loading stations for the work gear finishing stations A and B respectivley, the work gear loading stations being diametrically opposite their respective work gear finishing stations.

Each fixture 14, (Figures 27 and 28) commonly known as a head stock, comprises the housing 18, the sleeve 19 having a tight fit within the housing 18, the spindle 20 journaled in the sleeve and the lower work gear holding member 21 which is mounted in an enlarged end of the spindle and which, as shown, is a center.

Each fixture 15, (Figures 29 to 33 inclusive) commonly known as a tail stock, comprises the housing 22, the sleeve 23 longitudinally slidable within the housing 22, the spindle 24 journaled in and longitudinally movable with the sleeve 23 and the upper work gear holding member 25 which is mounted in an enlarged end of the spindle and which, as shown, is a center. The sleeve 23 has threaded to its upper end the tubular member 26 which encircles and preferably clears the reduced stem of the spindle 24. The tubular member has at its lower end the enlargement 27 which forms an abutment for the concentric inner and outer coil springs 28 and 29 respectively, the upper ends of which abut the slide 30 which slidably engages and is longitudinally movable within the housing 22. 31 is a collar threaded on the upper end of the tubular member 26 and forming an abutment engageable with the upper end of the slide 30 so that upon upward movement of the slide it contacts the collar and through the collar raises the tubular member and with it the spindle and work gear holding member.

To move the upper work holding member 25 toward the lower work gear holding member 21, the slide 30 has preferably formed integrally therewith the longitudinally extending rack 32 and this rack is engaged by the gear segment 33 which is secured to the shaft 34 journaled in the housing 22. 35 is a manually operable handle secured to the shaft 36 outside the housing 22, the shaft being journaled in the housing. The handle upon being swung in one direction by the operator effects resilient downward movement of the upper work gear holding member 25 toward the lower gear holding member 21 to exert a predetermined pressure upon the work gear 7.

For the purpose of locking the upper work gear holding member 25 in its adjusted holding position independently of the coil springs 28 and 29 means are provided to engage the sleeve 24 and hold it in its adjusted position. This means comprises the pin 37 which is slidable in the housing 22 transversely of and into engagement with the sleeve 24 after it has been advanced to advance the work gear holding member to its holding position. The pin 37 has the tapered face 38 engageable with a corresponding face 39 on the sleeve 24, these faces being inclined toward the axis of the spindle in a direction opposite to that taken by the spindle in being moved to its holding position.

40 is a multi-armed lever having the arm 41 pivotally mounted in the housing 22 by the pin 42, the second arm 43 for moving the pin 37 toward and away from the sleeve 23 and the third arm 44 for swinging the lever in a direction to move the pin 37 toward the sleeve 24. The arm 43 is preferably formed with the rounded surface 45 engageable with the shoulder 46 on the pin 37 to urge the latter toward the sleeve 23. The arm 43 is also connected to the pin 37 by the pin 47 to effect retraction of the pin 37 by means of the coil spring 48 which abuts the housing 22 and extends into and abuts the arm 43. The arm 41 is engageable with the housing 22 to limit swinging of the multi-armed lever 40 when retracting the pin 37 under action of the spring 48. 49 is a cam secured to the shaft 36 and engageable with the arm 44 to effect swinging of the multi-armed lever 40 to produce the locking action upon the spindle when in its work gear holding position.

50 is a link pivotally connected to the cranks 51 and 52 secured respectively to the shafts 34 and 36 and serving upon rotation of the shaft 36 by the handle 35 to rotate the shaft 34 and thereby advance the upper work gear holding member 25 to holding position through the intermediate mechanism including the gear segment 33, the slide 30 and the spindle 24. The pivots for connecting the link 50 to the cranks 51 and 52 are so located that when the gear segment has been swung forwardly a distance sufficient to firmly engage the upper work gear holding member 25 with the work gear and firmly hold the work gear against the lower work gear holding member 21, the line connecting the pivots has passed over or beyond the axis of the shaft 36 to thereby effectively lock the parts in their adjusted position.

With this construction the sleeve 23 rotatably carrying the spindle 24 and the upper work gear holding member 25 is resiliently advanced to advance the work gear holding member to holding position. At the same time the sleeve is locked in the advanced position independently of the spring means for advancing it. Furthermore, one manually operable handle serves both to advance the parts to work gear holding position and to lock the parts in this position.

For the purpose of indexing the turret 3 an electric motor is employed to drive the turret and mechanism is also employed to control operation of the motor and to accurately determine the adjusted positions of the turret. The motor and the mechanism form a self-contained unit located within and mounted on the overhead support 2.

As best seen in Figures 34–38 inclusive, 53 is the electric motor mounted upon the extension 54 of the bottom of the housing 55 of the unit, the housing being piloted to and supported by the overhead support 2. The motor has its shaft connected by means of the coupling 56 to the worm 57 which meshes with the worm wheel 58. The worm wheel is secured to the vertical shaft 59 which is journaled in the housing 55. The shaft 59 has secured to its lower end the driving gear 60 and to its upper end the driving index plate 61. The driving gear 60 is adapted to mesh with the arcuate toothed portions 62 and 62' at the periphery of the interrupted driven gear 63, the toothed portions alternating with plain portions or gaps 64 and 64' at the periphery of the driven gear which are preferably formed by removing certain of the gear teeth. The interrupted driven gear is on and preferably formed integral with the shaft 65 which is journaled in the housing 55 both above and below the interrupted driven gear and is formed with the upwardly tapered socket 66 which fits a corresponding tapered portion at the upper end of the stub shaft 9. The shaft 65 is also keyed to the stub shaft by the key 67 and further has the axial bore 68 through which extends the draw bolt 69. The draw bolt is threaded into the upper end of the stub shaft 9 and is threadedly engaged at its upper end by the nut 70 which abuts the shaft 65 and is adapted upon being tightened to firmly secure the stub shaft 9 to the shaft 65.

71 and 72 are respectively a driven index plate and a driven locking plate with the former below the latter and fixedly secured thereto by suitable means such as the bolts 73 and with the latter keyed to the upper end portion of the shaft 65 by the key 74. The driven index plate 71 is located above the driving index plate 61 and has the diametrically opposite lobes 75 and 75', the edges of which form cams engageable by the rolls 76 and 76' above and on the driving plate 61. There are two of these rolls diametrically opposite each other with their axes on the pitch line of the driving gear 60. The locking index plate 72 has the diametrically opposite locking notches 77 and 77' in its edges which are engageable with the locking bolt 78 which is movable radially of the locking index plate and is slidable in the bracket 79 bolted to the housing 55. The bolt is pivotally connected at its outer end by the pin 80 to the link 81 which in turn is pivotally connected to one arm of the bell crank 82, the other arm of which preferably carries the roll 83. This bell crank is pivotally mounted upon the bracket 79. The driving index plate has at its periphery the cam 84 which during rotation of the driving index plate is engageable with the roll 83 to force the locking bolt into one of the locking notches. The locking bolt is adapted to be retracted by means of the coil spring 85 located in the bracket 79 and having one end engageable with a downward extension of the pin 80 which pivotally connects the locking bolt to the link.

With the parts of the indexing mechanism in the positions as shown in Figures 36 and 38, it will be noted that the driving gear 60 registers with the plain surface on gap 64 of the driven gear 63 and that both rolls 76 and 76' are in engagement with the dwells 86 of the cam edges of the adjacent lobe 75 of the driven index plate 71, these dwells being concentric with the axis of the driving index plate 61. Assuming the driving index plate 61 to be rotated in the direction indicated by the arrow 87, the cam 84 moves past the roll 83 while the driven index plate 71 and the driven locking plate 72 remain stationary to allow the coil spring 85 to move the locking bolt 78 out of the locking notch 77 which it engages. After the locking bolt has been withdrawn from its locking notch the roll 76 engages the cam edge portion of the lobe 75 radially inwardly of the dwell 86 and rotates the driven index plate 71 and as a result the driven locking plate 72 in the direction indicated by the arrow 88. The rotation of the parts through the driving index plate continues until the axis of the roll 76 reaches the point 89 on the center line connecting the axes of the driven index plate 71 and the driving index plate 61 at which time the interrupted driven gear 63 has been rotated a sufficient distance to bring the first of the arcuate series of teeth 62' into mesh with the teeth of the driving gear 60. During this rotation of the driving index plate 61 by the roll 76 the roll 76' travels over the first half of the cam edge portion of the lobe 75 between the dwells 86 and holds the lobe against the roll 76. After the roll has reached the point 89 the driving gear 60 effects the rotation of the driven index plate 71 and the driven locking plate 72 through the teeth 62' of the interrupted driven gear 63, the roll 76 being out of contact with the lobe 75. The rotation of the parts through the gearing continues until the axis of the roll 76 has reached the point 90 which is diametrically opposite the point 89 and the axis of the roll 76' is at the point 89 and the neck of the lobe 75' rests against the roll 76' and the last of the arcuate series of teeth 62' of the driven gear passes out of mesh with the driving gear 60 and the latter registers with the plain surface or gap 64' of the driven gear so that the gearing no longer effects the driving. The driving index plate 61 being driven at a constant speed by the motor 53, the rotation of the driven elements is retarded through the roll 76' and the lobe 75' but the momentum of the driven elements is such that they reach positions corresponding to those shown in Figure 36 but with the driven elements advanced 180°. During the final portion of this movement the rolls 76 and 76' move over the dwells 86 so that the driven elements are stationary and the cam 84 engages the roll 83 to force the locking plunger 78 into the locking notch 77'. While the locking bolt 78 is being moved into the locking notch 77', the set screw 91 upon the arm 92 which is secured to the pin 80 engages the plunger 93 of the limit switch 94 to break the electric circuit to the motor 53. The limit switch is carried by the bracket 79. With this construction of indexing mechanism the turret 3 is advanced through an angle of 180°.

As best seen in Figures 3 to 10, inclusive, each of the main slides 4 and 5 carries the cutter head assembly 95 which is vertically slidable on the housing 96 of the associated main slide. The cutter head assemblies are alike and each comprises the cutter head 97, the carriage 98 and the sub-slide 99 (Figures 11 and 8A). The cutter head comprises the housing 100 and the bearing bracket 101 mounted on the housing and within which is journaled the spindle 102 to which the cutter 6 is preferably keyed and clamped. The cutter is formed in the usual manner with serrations or grooves substantially parallel to the plane of rotation of the cutter in the faces of its teeth forming lateral shoulders for shaving the faces of the teeth of the work gear upon relative reciprocation of the cutter and work gear longitudinally of the latter. To provide for adjustment of the crossed axes arrangement of the cutter and the work gear the cutter head 97 is angularly adjustable relative to the carriage 98. This is accomplished by pivotally mounting the housing 100 on the carriage 98 and by providing mechanism for angularly adjusting the housing about the axis of the pivot relative to the carriage. In detail the pivotal mounting is provided by fixedly securing the bearing member 103 to the housing 100 and rotatably mounting this bearing member in the bearing face bounding the hole 104 in the carriage 98 (Figures 11 and 19). The angular adjusting mechanism is provided by forming the cap 105 secured to the upper end of the housing 100 with the vertical slot 106 and by providing the carriage 98 with the horizontal slot 107 and further by providing the blocks 108 and 109 slidable in the slots 106 and 107 respectively. The block 109 has the pin 110 extending through and journaled in the block 108 and the block 109 is threadedly engaged by the shaft 111 (Figures 7 and 11) extending through the block and journaled in the carriage 98. The arrangement is such that rotation of the shaft 111 angularly adjusts the cutter head 97 about the axis of its bearing member 103 relative to the carriage 98. The cutter 6 is driven by the gearing 112 (Figure 11) located in the housing 100 and including the bevel gear 113, the shaft of which is journaled in the bearing member 103 and is connected by the universal joint 114 to the shaft 115. The construction is such that the axis of the bearing member 103 is at right angles to the axis of the shaft 102 and the intersection of the two axes is within the confines of the cutter.

The carriage 98 as seen in Figures 8A, 11 and 19 is preferably pivotally mounted upon the sub-slide 99 to swing through a vertical path for crowning the gear by means of the axially aligned spaced pins 116, the axes of which are at right angles to and register with the axis of the bearing member 103. The sub-slide 99 is provided at its upper end with the nut 117 which threadedly engages the vertical screw 118 which upon rotation in opposite directions raises and lowers the sub-slide and with it the remainder of the cutter head assembly. As illustrated in Figure 4, nut 117 is keyed and also bolted to the sub-slide 99.

Figure 3:
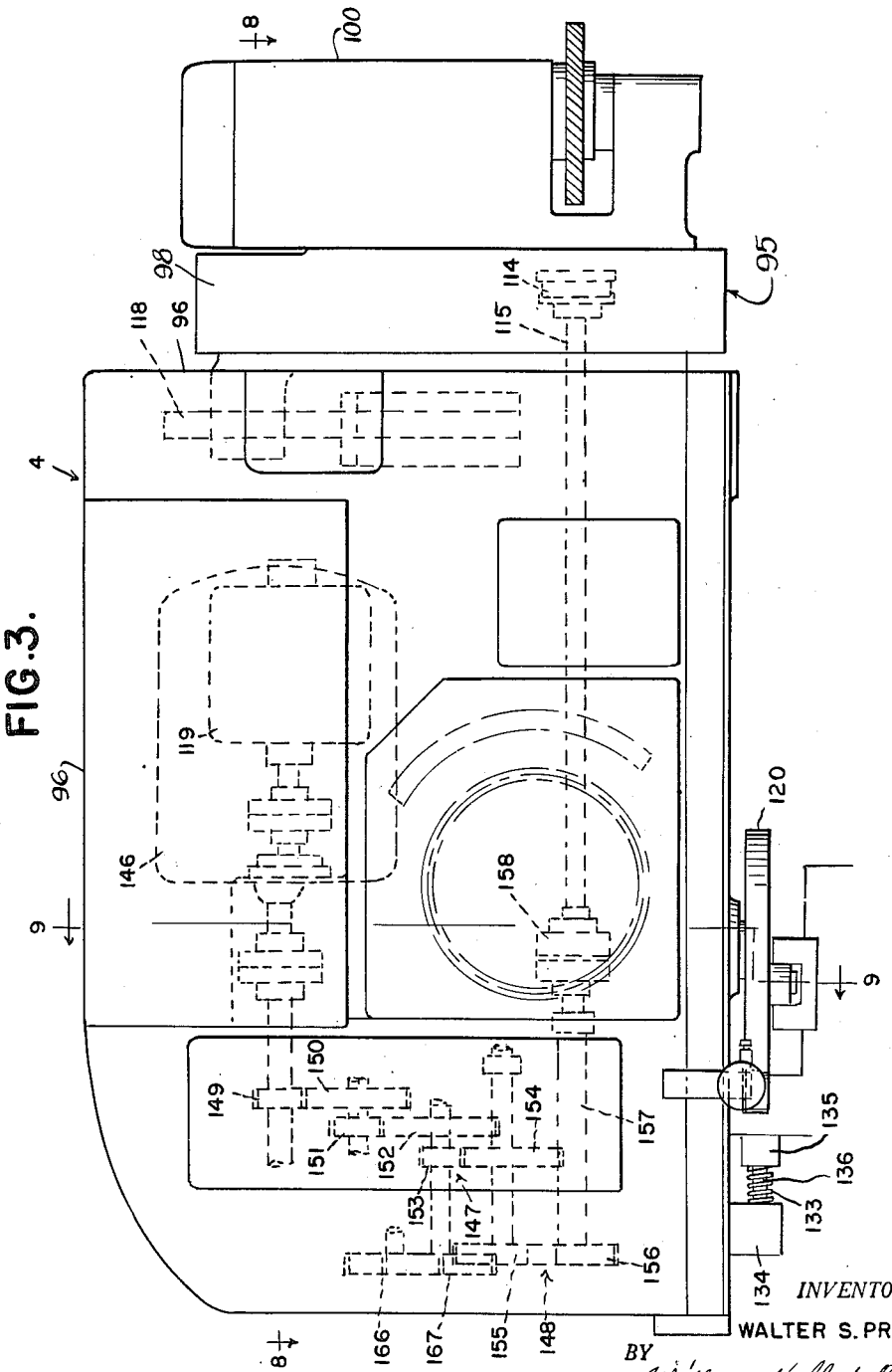
Figure 3 is a side elevation of one of the main slides and the associated cutter head assembly.

Each of the main slides 4 and 5 is alike so that the main slide 4 will be described. This main slide, as seen in Figure 3, has the housing 96 which is slidable on horizontal ways on the base 1, driving mechanism for reciprocating the main slide, control mechanism for controlling the reciprocation of the main slide and mechanism connected to the shaft 115 for driving the cutter 6 and also connected to the screw 118 for vertically reciprocating the cutter head assembly 95.

The driving mechanism for reciprocating the main slide comprises the electric motor 119, cam mechanism including the cam 120 and gearing for driving the cam from the motor, the motor being mounted within and the gearing being journaled in the housing 96. Referring to Figures 3, 8 and 9, in detail the motor 119 is coupled to the worm 121 which meshes with the worm wheel 122 upon the vertical shaft 123. This shaft has secured to its lower end the gear 124 which meshes with the gear 125 on the shaft 126. This latter shaft is pivotally integral with the cam 120 which is located below the housing 96. The cam mechanism also includes the slide 127 (Figure 14) adjustably mounted on the base 1 and carrying the roll 128 and the block 129 which latter has the upstanding legs 130 and 131 spaced from each other a distance to receive the roll 132 below and carried by the cam 120. The roll 128 is engageable with the gradual rise peripheral cam surface $120'$ (Figures 16, 17 and 18) and the peripheral dwells $120^2$ and $120^3$ at the ends of the cam surface $120'$ of the cam 120. 133 (Figure 10) is a coil spring for maintaining contact between the cam and the roll 128, this coil spring abutting the downwardly extending projection 134 of the main slide 4 and the block 135 which abuts the rear end of the slide 127. 136 is screw threaded into the projection 134 and extending freely within the block 135 to hold the latter in position. The roll 132 is engageable with the leg 130 and also with the opposite sides of the leg 131, the edge of this latter leg around which the roll passes being semi-cylindrical with the center of its radius in line with the axis of the shaft 126. As best seen in Figures 14 and 15, for longitudinally adjusting the slide 127 upon the base 1 there is the screw $137'$ extending longitudinally below the slide and journaled in the base 1 and threadedly engaging the nut 138 secured to the slide. To lock the screw in its adjusted position there is the segmented lock nut 137 threaded upon the screw and having the arcuate series of teeth 140 meshing with the teeth of the pinion 141 which laterally extends parallel to the screw $137'$ and is journaled in the base 1 by means including bearing support 139. Both the screw and the pinion are provided with suitable wrench engaging portions at the rear end of the base. Relative motion between the screw $137'$ and the lock nut 137 is limited by a pin $137a$ projecting from the nut 138 and positioned between shoulders $137b$ formed at the upper end of the nut 137. The relative motion permitted is sufficient to allow the nut 137 to be moved between a clamping position in which it bears against the threads of the screw $137'$ and thus prevents rotation thereof to a position in which its threads are accurately lined up with the threads of the nut 138, at which time the screw $137'$ may be rotated by a suitable hand tool.

The construction of the driving mechanism for the main slide is such that upon forward rotation of the motor 119 when the main slide is fully retracted and the parts of the cam mechanism occupy the approximate positions shown in Figure 17 the cam 120 is rotated in the direction indicated by the arrow E and the roll 132 upon the cam acts upon the leg 130 to advance the main slide until the roll reaches the approximate position shown in Figure 16 at which time the peripheral dwell 120² of the cam 120 is in contact with the roll 128. Upon continued forward rotation of the motor the peripheral cam surface 120' acting on the roll 128 advances the main slide. This continued forward rotation of the motor is intermittent so that the main slide is intermittently advanced to intermittently feed the cutter toward the work gear at the ends of the relative transversing strokes of the cutter and work gear parallel to the axis of the work gear. At the end of the intermittent advance the parts of the cam mechanism occupy the approximate positions shown in Figure 18.

The peripheral cam surface 120' has a predetermined gradual rise to advance the main slide and the cutter carried thereby in small increments so that small amounts of stock will be successively removed from the faces of the teeth of the work gear by the cutter. However, the advance of the main slide by the roll 132 acting on the leg 130 is through an appreciable distance and at a more rapid rate.

Upon reverse rotation of the motor 119 the cam 120 is rotated in the opposite direction as shown by the arrow F in Figure 18 to occupy the position shown in Figure 16 at which time the roll 132 is in the slot between the legs 130 and 131, the retraction being controlled first by coaction of the cam surface 120 and the roll 128. Upon continued reverse rotation of the motor 119, the roll 132 reacts against the leg 131 to further retract the main slide at a rapid rate until the parts assume the approximate position shown in Figure 17.

The desired predetermined positioning of the main slide relative to the turret is secured by turning the screw 137' after releasing the lock nut 137 by turning the lock pinion 141.

The control mechanism for controlling the reciprocation of the main slide in general comprises the dial plate 142 (Figures 9 and 9A) driven by the shaft 143 and carrying dogs which during rotation of the dial plate are engageable with limit switches. The dial plate is secured to the shaft 143 which is journaled in the housing 96 and has secured to it the spiral gear 144 which meshes with the spiral teeth 145 preferably formed integral with the shaft 123.

The mechanism for driving the shaft 115, which through the gearing 112 drives the cutter 6, as best seen in Figures 3 and 8, comprises the electric motor 146 and the gearing 147 which includes the change speed gearing 148. The gearing 147 as illustrated comprises the pinion 149, the gear 150 in mesh with the pinion, the pinion 151 upon the same shaft as the gear 150, the gear 152 meshing with the pinion 151, the pinion 153 upon the same shaft as the gear 152 and the gear 154 meshing with the pinion 153. The change speed gearing 148 comprises the gear 155 upon the same shaft as the gear 154 and the gear 156 meshing with the gear 155 and secured to the shaft 157 which is connected to the shaft 115 by the universal joint 158 (Figure 3).

Figure 10:
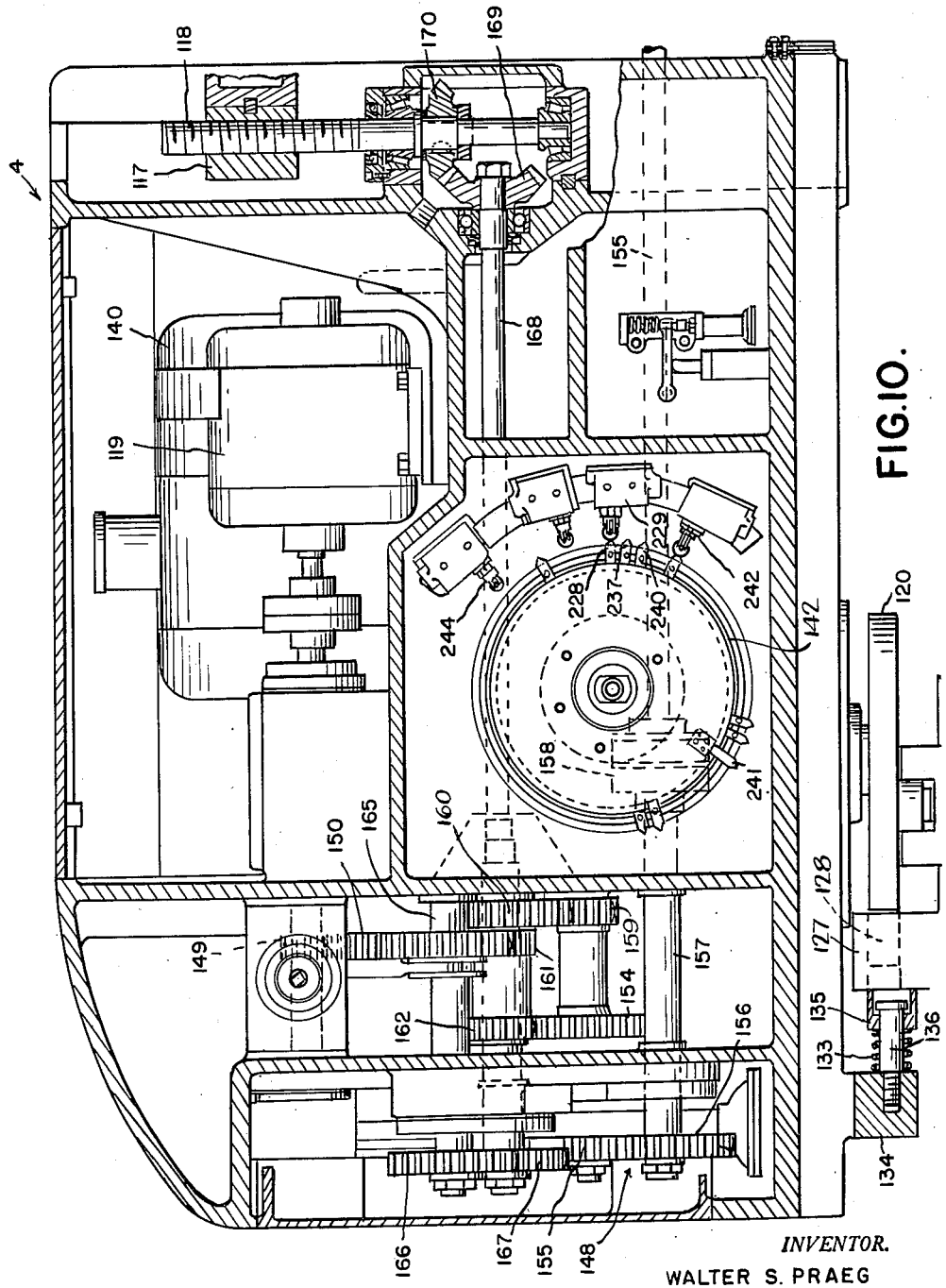
Figure 10 is a cross section on line 10—10 of Figure 4.
Figure 13:
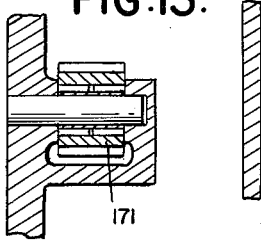
Figure 13 is a cross section illustrating an extra gear forming part of the gearing of Figure 12.
Figure 12:
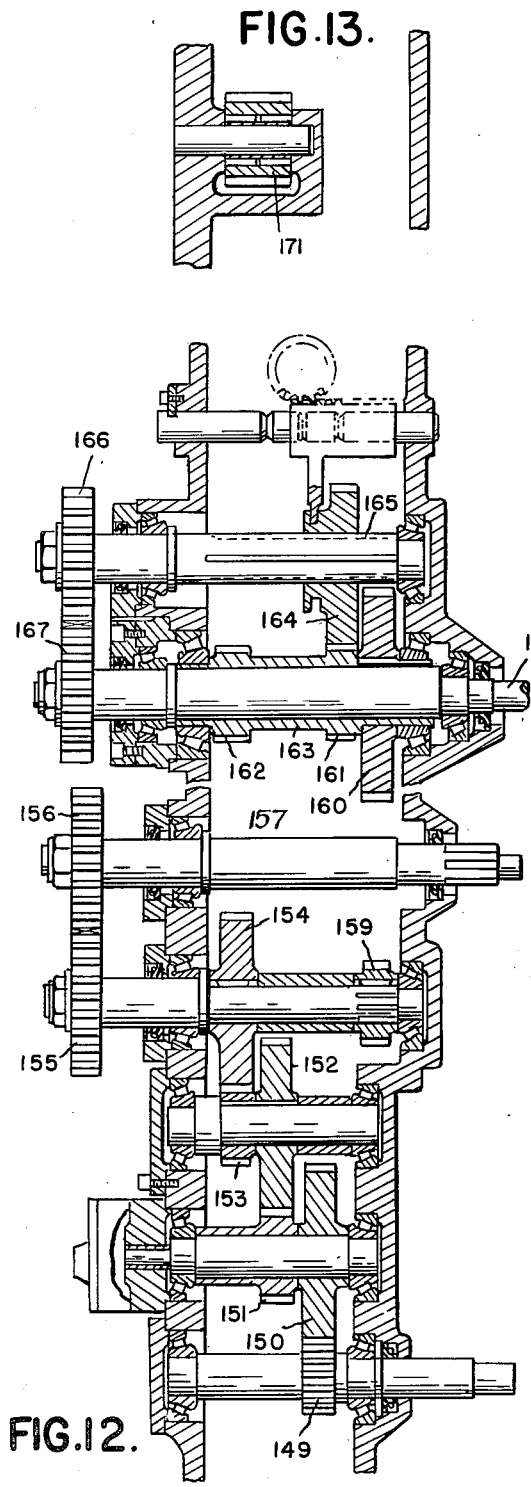
Figure 12 is an extended cross section on line 12—12 of Figure 5.

For driving the screw 118 to vertically reciprocate the cutter head assembly another gear train driven by the gear 154 is provided. This gear train, as seen in Figures 10 and 12, comprises the pinion 159 upon the same shaft as the gear 154, the gear 160 meshing with the pinion 159, the pinions 161 and 162 upon the hollow shaft 163 to which the gear 160 is secured, the sliding gear 164 slidable upon the shaft 165, the change speed gear 166 upon the shaft 165, the change speed gear 167 meshing with the change speed gear 166 upon the shaft 168, the bevel gear 169 upon the shaft 168 and the bevel gear 170 meshing with the bevel gear 169 and secured to the screw 118.

The sliding gear 164 is adapted to be axially moved to a position to mesh with the pinion 161 and to another position to mesh with the pinion 171 (Figure 13) which at all times meshes with the pinion 162 so that the screw 118 depending upon the position of the slide gear may be rotated in either direction with the motor 146 rotating in one direction.

For the purpose of relieving the pressure exerted by each of the upper work gear holding members 25 upon the work gears 6 and also for the purpose of partially releasing the upper work gear holding members after the teeth of the work gears 7 have been finished, means is provided operable upon the turning of the turret and shortly after the work gear holding fixtures have passed Station B to partially return the handle 35 to release the link 50 from locking position and also to withdraw the locking pin 37.

As seen in Figures 25, 25A and 26, a cam 172 is secured to the under side of the overhead support 2 and 173 is a plunger having its upper end engageable with the cam and adapted to be moved downwardly by the cam to partially return the handle 35. The plunger is slidable in the bracket 174 which is bolted to the body 12 of the turret and the plunger is normally urged upwardly by means of the coil spring 175 to a position limited by the collar 176 secured to the plunger and adapted to abut the upper furcation of the bracket. 177 (Figure 29) is a push rod threadedly engaging the rod 178 which is vertically slidable in the bracket 179 bolted to the housing 22. The rod 178 is formed with the integral rack teeth 180 which mesh with the teeth of the pinion 181 secured to the shaft 36 to which the handle 35 is secured. When the handle is swung downwardly to move the upper work gear holding member 25 downwardly to holding position the push rod 177 is moved upwardly by means of the pinion 181 and the rack 180 to abut the lower end of the plunger 173. As a result during the rotation of the turret, the plunger 173 is forced downwardly by the cam 172 to lower the push rod 177 and partially return the handle 35 by means of the rack 180 and the pinion 181. The cam is designed to force the plunger 173 downwardly a sufficient distance to rotate the shaft 36 and thereby move the link 50 from its locked position and to fully withdraw the locking pin 37 from engagement with the sleeve 24. The operator may then readily remove the work gear.

To position each work gear so that its teeth will be accurately located to mesh with the teeth of the cutter when the work gear is at either the finishing Station A or the finishing Station B, the turret has secured to each of its faces the locater plunger 182 (Figures 25 and 25A) which is provided with a nose engageable in any of the spaces between the teeth of the work gear and shaped to engage the faces of the adjacent teeth. Each locater plunger is longitudinally slidable in the arm 183 which is vertically adjustably secured to the turret between the work gear holding fixtures 14 and 15 by suitable means such as bolts engaging one of the slots 13. Each locater plunger is provided with the longitudinally extending rack 184 which is engaged by the gear segment 185 journaled in the arm 183 and keyed to the shaft 186. 187 is a manually operable handle secured to the gear segment. Each shaft 186 is journaled at its upper end in the arm 188 which extends laterally from and is integral with the bracket 174.

A spring toggle is provided for holding each locater plunger either in or out of engagement with the associated work gear. The toggle comprises the links 189 and 190 pivotally connected to each other by the pin 191. The link 189 is keyed to the upper end of the shaft 186 and the link 190 slidably engages the pin 191 and is pivotally mounted upon the arm 188 by the pin 192. 193 is a coil spring abutting the head of the link 190 at its pivotal end and a washer which abuts the pin 191. The construction is such that the spring toggle when in one position holds the locater plunger in engagement with the work gear and when in the other position holds the locater plunger out of engagement with the work gear. In passing from one position to the other between the links the pin 191 passes the center line between the axes of the shaft 186 and the pin 192 and the spring toggle has resilient action holding the toggle either in the one position or the other position.

The locater plunger 182 is movable into engagement with the adjacent work gear by means of the handle 187 and is movable out of engagement with this work gear by devices at each of the finishing Stations A and B and mounted on the overhead support 2. Each device comprises the bell crank 196 (Figure 26) having one arm engageable with the arm 195 and having the other arm engageable with the core of the push solenoid 197. The arm 195 is integral with the link 189 and extends at the opposite side of the shaft 186. The return of the bell crank is accomplished by means of the coil spring 198 located in an extension of the housing for the solenoid 197.

As best seen in Figures 8A, 11, 22, 23 and 24, to position each cutter so that its teeth will be accurately located to mesh with the teeth of the associated work gear, the cutter spindle 102 has secured to its upper end the plate 199 to which is removably secured the locater disk 200 which has the peripheral V-shaped teeth 201 corresponding in number to the number of teeth of the cutter 6. 202 is a locater plate having the V-shaped tooth 203 engageable in a space between adjacent teeth of the locater disk 200 and shaped to fit the sides of the adjacent teeth. This locater plate is mounted upon the upper end of the lever 204, the lower end of which is pivoted to the cap 105. 206 and 207 are links pivotally connected to each other by the pin 208 and forming a toggle linkage. The link 206 is pivotally connected to the lever 204 and the link 207 is secured to the shaft 209 which is journalled in the cap 105. 210 and 211 are arms secured to the opposite ends of the shaft 209, the arm 210 being pivotally connected to the core of the pull solenoid 212 and the arm 211 being engageable by the core of the push solenoid 213 (Figure 23). Both of these solenoids are mounted on the cap 105. In operation the pull solenoid 212 straightens the toggle linkage to swing the lever 204 to engage the tooth of the locater plate 202 with adjacent teeth of the locater disk 200 while the push solenoid 213 breaks the toggle linkage to remove the tooth of the locater plate from the teeth of the locater plate.

To accomplish crowning of each work gear while it is being finished, as best seen in Figures 7, 8A and 19, each cutter head assembly 95 is associated with a cam 214 which has the cylindrical body 215 and also the integral diametric tongue 216 at the inner end of the body. The body is journaled in the bracket 217 (Figure 8A) which is accurately positioned on the housing 96 of each main slide as by being keyed and bolted thereto. 218 is a follower journaled in the carriage 98 and having the diametric slot 219 for slidably receiving the tongue 216. With this construction during the up and down reciprocation of the carriage the latter and also the cutter head are rocked about the axis of the pins 116 to impart an elliptoid movement to the cutter.

If crowning of the work gears is not desired, each cam 214 is removed and the pin 220 (Figure 21) is inserted to extend through each follower 218 and into the adjacent bushing 221 which is mounted in the sub-slide 99, the pin serving to lock the carriage to the sub-slide.

The operation of the machine is electrically controlled there being in addition to the starter push button electrical control a number of electrical controls which are automatically operated during the operation of the machine.

One of these electrical controls is dependent upon the swinging of the handle 35 at each of the Stations C and D of the machine to move the associated upper work gear holding member 25 downwardly to its holding position to properly hold the semi-finished or roughed-out work gear which has been inserted between the work gear holding fixtures. As shown, each of the upper work gear holding fixtures 15 carries the limit switch 222 (Figure 29), the plunger of which is engageable by the set screw 223 threaded into the lateral arm 224 upon the lower end of rod 178. As each handle is swung downwardly the rod is raised to raise the set screw against the plunger of the limit switch to close the switch.

Another electrical control is dependent upon the operation of the locater plunger 182 at each of the stations C and D into full engagement with its respective work gear. This is accomplished by movement of the handle 187 (Figure 25A) which operates the toggle linkage including the links 189 and 190 and thereby brings the set screw 225 into engagement with the plunger of limit switch 226 to close this limit switch. The set screw is mounted on the arm 227 which is integral with the link 189 and the limit switch is mounted on the arm 188.

The closing of the limit switches 222 and 226 closes the circuit to the motor 53 so that indexing of the turret now takes place until the circuit to the motor is broken by the limit switch 94, the work gears which were at the Stations C and D now being respectively at the Stations B and A.

The limit switch 94 at the time of opening the circuit to the motor 53 also closes the circuit to the motors 119 of the main slides 4 and 5 which are located so that their cutters are at Stations A and B respectively. Each motor 119 drives its main slide forwardly until the dog 228 (Figure 10) upon the dial plate 142 contacts the plunger of the limit switch 229 upon the housing 96 which breaks the circuit to the motor 119.

The limit switch 229 at the time of breaking the circuit to the motor 119 also makes the circuit to the push solenoid 197 at the same Station A or B which releases the locater plunger 182 from the work gear. The locating set screw 233 upon the arm 227 engages the adjacent plunger of the limit switch 234 which is carried by the housing of the push solenoid 197 to thereby make the circuit to the push solenoid 213 of the cutter head associated with the main slide. This solenoid moves the associated locater plate 202 out of engagement with the associated locater plate 200 thereby releasing the associated cutter. 230 (Figure 11) is another limit switch upon the cap 105 of each cutter head and having its plunger engageable by the set screw 231 (Figure 24) upon the arm 232 at the upper end of the lever 204 so that as the associated locater plate 202 is moved out of engagement with the locater disk 200 the set screw upon the lever engages the plunger of the last mentioned limit switch to close the circuit to the motor 146 thereby starting rotation of the associated cutter.

Assuming the cutter head assembly to be in its uppermost position, each motor 146 in addition to driving the associated cutter 6 moves the associated cutter head assembly downwardly until the dog 235 (Figure 7) on the subslide 99 contacts the plunger of the limit switch 236 which is on the housing 96 of the main slide. This limit switch breaks the forward circuit to the motor 146 and makes the reverse circuit to this motor and also closes the circuit to the motor 119 which feeds forwardly until the dog 237 (Figure 10) upon the dial plate 142 contacts the plunger of the limit switch 229, previously mentioned, thereby breaking the circuit to the motor 119. The reverse drive of the motor 146 in addition to reversing the direction of the cutter 6 moves the cutter head assembly 97 upwardly until the dog 238 (Figure 7) upon the subslide 99 engages the plunger of the limit switch 239. The limit switch 239 upon actuation by the dog 238 breaks the reverse circuit to the motor 146, makes the forward circuit to this motor and also makes the circuit to the motor 119 which continues running until the dog 240 upon the dial plate 142 contacts the plunger of the limit switch 229. These operations continue at both stations A and B for a predetermined number of vertical reciprocations of the cutter head assembly depending upon the amount of stock to be removed from each of the work gears until the dog 241 (Figure 10) upon each dial plate 142 contacts the plunger of the limit switch 242 which breaks the forward circuit of the associated motor 119 and makes the reverse circuit of this motor and also breaks the circuit to the associated motor 146 so that the latter stops. The reverse of the motor 119 continues until the dog 228 contacts the plunger of the limit switch 229 which temporarily breaks the circuit to the motor 119 as controlled by a time-delay relay (not shown) which is set into operation when the dog 241 contacts the plunger of the limit switch 242. During this temporary stopping of the motor 119 the time delay relay closes the circuit to the associated pull solenoid 212 which moves the associated locater plunger 202 into engagement with the locater plate 200. After the locater bolt has been engaged with the locater plate the time delay then effects the closing of the reverse circuit to the motor 119 to allow the motor to continue in its reverse direction until the dog 241 engages the plunger of the limit switch 244 which breaks the circuit to the motor 119. Since this operation is duplicated both main slides 4 and 5 are now in their original starting positions. The machine is now ready for insertion of two semi-finished or roughed-out work gears after the work gears previously inserted have been removed,

What I claim as my invention is:

1. A gear finishing machine comprising a finishing tool, a turret, a plurality of gear holding means angularly spaced from each other on said turret, means for indexing said turret to successively position the gears for engagement by said tool, means for locating the gear positioned for engagement by said tool in a predetermined angular position to accurately locate a space between adjacent teeth of the gear with respect to said tool, and means operated by said gear locating means for controlling the operation of said turret indexing means.

2. A gear finishing machine comprising a finishing tool, a turret, a plurality of gear holding means angularly spaced from each other on said turret, means for indexing said turret to move a gear to a station for engagement by said finishing tool, means for locating the gear positioned for engagement by said finishing tool in a predetermined angular position to accurately locate a space between adjacent teeth of the gear with respect to said tool, means operated by said gear holding means for controlling the indexing of said turret and means operated by said gear locating means for also controlling the indexing of said turret.

3. A gear finishing machine comprising a turret, gear holding means on said turret, a circular gear-like finishing tool, a slide carrying said tool and movable toward and away from said turret to mesh said tool with the gear, means for angularly positioning the gear to mesh said tool with the gear, means for angularly positioning the tool to mesh with said gear, and means on said slide for controlling the releasing of said gear positioning means upon movement of said slide toward said turret.

4. A gear finishing machine comprising a turret, gear holding means on said turret, a circular gear-like finishing tool, a slide carrying said tool and movable toward and away from said turret to mesh said tool with the gear, means including a locator member for locating said tool in a predetermined angular position, a second means including a second locator member for locating the gear in a predetermined angular position, said means locating said tool and the gear to accurately mesh with each other, means controlled by said slide for moving said first locator member to release position and means operated by said last mentioned means for moving said second locator member to release position.

5. A gear finishing machine comprising a turret, a gear holding means on said turret, a circular gear-like finishing tool, a slide carrying said tool and movable toward and away from said turret to mesh said tool with the gear, means for rotating said tool and the gear in mesh, means including a locator member for locating said tool in a predetermined angular position, a second means including a second locator member for locating the gear in a predetermined angular position, said means locating said tool and the gear to accurately mesh with each other, means controlled by said slide for moving said first locator member to release position, means operated by said last mentioned means for moving said second locator member to release position and means on said slide operable subsequently to the movement of said locator members to release position for controlling the operation of said means for rotating said tool and the gear.

6. A gear finishing machine comprising a turret, a plurality of gear holding means angularly spaced from each other on said turret, a plurality of finishing tools each engageable with a gear, means for indexing said turret to move the gears carried by certain of said gear holding means to positions for engagement by said tools, means for locating each of said last mentioned gears in a predetermined angular position to accurately locate a space between adjacent teeth of each gear with respect to said tools and means operated by said gear locating means for controlling the operation of said turret indexing means.

7. A gear finishing machine comprising a turret, a plurality of gear holding means angularly spaced from each other on said turret, a plurality of finishing tools each engageable with a gear, means for indexing said turret to move the gears carried by certain of said gear holding means to positions for engagement by said tools, means for locating each of the last mentioned gears in a predetermined angular position to accurately locate a space between adjacent teeth of each gear with respect to the tool, means operated by said gear holding means for controlling the indexing of said turret and means operated by said gear locating means for also controlling the indexing of said turret.

8. A gear finishing machine comprising a rotary tool support for mounting a rotary gear-like tool, a rotary work support comprising releasable means for engaging a work gear, a motor for rotating one of said supports, locating means for each of said supports effective to position a tool and gear carried by said supports with their teeth in position to mesh, means for effecting relative radial movement between said supports to bring the tool and gear into mesh, and means responsive to meshing of the gear and tool to release said locating means for rotation of said supports.

9. A gear finishing machine comprising a rotary tool support for mounting a rotary gear-like tool, a rotary work support comprising releasable means for engaging a work gear, a motor for rotating one of said supports, locating means for each of said supports effective to position a tool and gear carried by said supports with their teeth in position to mesh, means for effecting relative radial movement between said supports to bring the tool and gear into mesh, means responsive to meshing of the gear and tool to release said locating means for rotation of said supports, and means operated by movement of a part of one of said locating means into release position to start said motor.

10. A gear finishing machine comprising a work support for mounting a gear for rotation, a locating plunger having a portion movable into a tooth space of a work gear, a rotary tool support, a motor for rotating said tool support, a locator for locking said tool support in predetermined angular position, electrical interlock means maintaining open the circuit of said motor when said locator is in position to lock said tool support, means for relatively moving said supports to bring a gear on said work support and a gear-like tool on said tool support from separated loading position to intermeshed working position, and means operable by movement of said supports to working position to release said plunger and locator.

11. In a gear finishing machine a rotary cutter spindle, a camming disk having peripheral pointed teeth connected to said spindle, a locator plate having a pointed tooth movable radially of said disk, a motor for rotating said spindle, means for moving said plate radially of said disk to effect angular positioning of said disk.

12. In a gear finishing machine, a turret, a work support on said turret, means for indexing said turret to move said work support from a loading station to a working station, a plunger adjacent said work support manually movable into a tooth space of a gear on said work support, a solenoid at said working station, a means connected to said plunger actuated by said solenoid to release said plunger at said working station.

13. In a gear finishing machine, a rotary work support, a rotary tool support, a slide carrying one of said supports for effecting relative radial approach and separation between said supports to bring a gear member and gear-like tool member carried thereby into and out of meshing engagement, a motor for rotating one of said supports, locator means for said motor driven support to lock said support with the member carried thereby in predetermined angular position, locator means for said other support to lock the member carried thereby in predetermined angular position, means operable by movement of said slide to meshed position of said members to release both of said locator means and to thereafter start said motor.

14. In a gear finishing machine, a rotary work support for a gear, a tool support for a tool having portions adapted to enter into tooth spaces of a gear mounted on said work support, means for effecting relative travel between said supports substantially radially of one of said supports to bring a tool and work gear into engagement, locator means cooperating with said work support and movable into engagement with a tooth space of a work gear carried thereby to insure that such gear is properly located for entry of such tool portion into the tooth spaces of such gear upon said relative travel, motor means for effecting said relative travel, control means effective to prevent operation of said motor means until said locator means has moved fully into such tooth space, and locator release means operable automatically by completion of said relative travel.

15. A gear finishing machine having a loading station and a working station, a tool spindle for carrying a gear-like tool at said working station, a pair of work spindles movable sequentially between loading and working stations, manually operated means for setting a work gear in predetermined position of rotation at said working station, said means comprising biasing means effective to preserve said setting upon release of said manually operated means, and automatic means operable only after meshing of the work gear with its gear-like tool at said working station for freeing said gear for rotation.

WALTER S. PRAEG.

REFERENCES CITED

The following references are of record in the file of this patent:

UNITED STATES PATENTS

| Number | Name | Date |
| --- | --- | --- |
| 1,790,560 | Tanner et al. | Jan. 27, 1931 |
| 1,829,263 | Carlsen | Oct. 27, 1931 |
| 1,928,770 | Uhlmann et al. | Oct. 3, 1933 |
| 2,107,543 | Miller | Feb. 8, 1938 |
| 2,150,313 | Bauer | Mar. 14, 1939 |
| 2,227,491 | Drummond | Jan. 7, 1941 |
| 2,343,407 | Galloway | Mar. 7, 1944 |
| 2,394,757 | Drummond | Feb. 12, 1946 |